(12) United States Patent
Sekar

(10) Patent No.: US 10,997,195 B1
(45) Date of Patent: May 4, 2021

(54) SYSTEM AND METHODS FOR USER-CONFIGURABLE VIRTUAL APPLIANCE FOR ADVANCED ANALYTICS USING STREAMING/IOT/BIG DATA

(71) Applicant: OpenMetrik Inc., Princeton, NJ (US)

(72) Inventor: Chandra Sekar, Princeton, NJ (US)

( * ) Notice: Subject to any disclaimer, the term of this patent is extended or adjusted under 35 U.S.C. 154(b) by 0 days.

(21) Appl. No.: 16/858,592

(22) Filed: Apr. 25, 2020

(51) Int. Cl.
| | | |
|---|---|---|
| *G06F 16/00* | (2019.01) | |
| *G06F 16/25* | (2019.01) | |
| *G06F 16/22* | (2019.01) | |
| *G06N 20/00* | (2019.01) | |

(52) U.S. Cl.
CPC ........ *G06F 16/254* (2019.01); *G06F 16/2282* (2019.01); *G06N 20/00* (2019.01)

(58) Field of Classification Search
CPC ............................ G06F 16/254; G06F 16/2282
See application file for complete search history.

(56) References Cited

U.S. PATENT DOCUMENTS

| | | | | |
|---|---|---|---|---|
| 2017/0006135 A1* | 1/2017 | Siebel | ....................... | G06F 8/10 |
| 2017/0132300 A1* | 5/2017 | Sekar | ..................... | G06F 16/26 |
| 2020/0082013 A1* | 3/2020 | Triplet | ................. | G06K 9/6219 |

* cited by examiner

*Primary Examiner* — Khanh B Pham
(74) *Attorney, Agent, or Firm* — Changi Wu; Changi Wu Law Office

(57) ABSTRACT

A system for integrated performance measurement environment comprises a plurality of composite data from a plurality of composite data sources, wherein the plurality of composite data further comprises a plurality of structured data, a plurality of unstructured data, and a plurality of signal data; an extract transform load module; a database receiving the plurality of composite data from extract transform load module and storing the plurality of composite data as the plurality of stored data; a business logic module; at least one graphical user interface; a set of graphical presentations of a plurality of processed data comprising charts, graphs, reports, and tables, and a combination thereof on a computer device; and at least one network; and methods performing the same including extracting, transforming, and loading composite data into the system, retrieving data in accordance with rules in metrics catalog and business intelligence blocks, drilling down the metrics catalog and business intelligence blocks, and collaborating over the system and method thereof.

5 Claims, 21 Drawing Sheets

SALES Data Layout (INPUT-S01)

| Serial No | Measured On | Region | Product | Sales Amount | Overhead | Commission Paid | Commission Percentage % |
|---|---|---|---|---|---|---|---|
| 1 | 7-Jul-15 | Europe | iPhone | 29000 | 900 | 300 | 1.07% |
| 2 | 8-Jul-15 | Asia | Samsung | 18000 | 800 | 250 | 1.45% |

FIG. 2a

Warehouse Data Layout (INPUT-S02)

| Serial No | Measured On | Warehouse | Product | Qy | Wait Days at Shelf |
|---|---|---|---|---|---|
| 1 | 7-Jul-15 | Zurich | iPhone | 530 | 32 |
| 2 | 8-Jul-15 | Peking | Samsung | 760 | 34 |

FIG. 2b

Twitter Feed Data Layout (INPUT-U01) — 106

| Serial No | Measured On | Commented By | Comment | Sentiment keywords | Likely to Buy % |
|---|---|---|---|---|---|
| 1 | 7-Jul-15 | John M | I am unsure of this auto insurance MyAutoCo. Cant decide if this is good. However, let us give it a try | unsure, can't decide, give it a try | 32% |
| 2 | 8-Jul-15 | George A | Sound good - considering my current insurance is worthless, I am going to contact MyAutoCo. | sounds good, worth contacting | 68% |

FIG. 2c

Patient Temperature Data Layout (INPUT-IoT-01) — 108

| Serial No | Measured On | Patient Id | Sensor Id | Sensor Type | Set Point Reading | Actual Reading | Msg Reading Number | Msg Timestamp | Msg Topic Id | Msg Partition Id | Msg Offset |
|---|---|---|---|---|---|---|---|---|---|---|---|
| 1 | 7-Jul-15 | P015637 | RTD-023 | RTD Temp Sensor | 98.4 F | 104.2 F | 1898989 | 2015:07:15 23:34 | Poll-078 | Partition 1 | 36.2 |
| 2 | 7-Jul-15 | P090891 | RTD-036 | RTD Temp Sensor | 99.2 F | 100.1 F | 1898990 | 2015:07-15 23:34 | Poll-078 | Partition 2 | 34.2 |

FIG. 2d

| Layout Id | INPUT-S01 | INPUT-S02 | INPUT-U01 | INPUT-IoT-01 |
|---|---|---|---|---|
| Layout Name | Sales Data | Warehouse Data | Twitter Feed | Patient Temperature |
| How often | Weekly | Monthly | Streaming Text | Streaming IoT Signal |
| composite data Owner | John Mayner | George Wagner | Alan Brommet | Tiara Vergata |
| Source System | SAP | Oracle | Purchased from Consumer Eval Co. | Read from DACS (data acquisition system) |
| Script Name | runbatch08.sql | | | |
| Whom to Notify | Emp Id of email recipient | Emp Id of email recipient | Emp Id of email recipient | Emp Id of email recipient |
| System Owner | SAP owner Employee Id | Oracle owner Employee Id | Consumer Eval Co Vendor Contact Name | DACS Owner Employee Id |
| Input Mode | File dropped in the composite data FTP site (Push) | CSV manual upload | Free-form text file manual upload | IoT signal data streaming in real-time |
| MD Type (CDMF Data Space name) | CDMF Space 1 | CDMF Space 1 | CDMF Space 2 | CDMF Space 2 |
| Pre-Processing (Pre-Script Name) | Script to execute BEFORE data upload begins | Script to execute BEFORE data upload begins | Script to execute BEFORE data upload begins | Script to execute BEFORE data upload begins |
| Post-Processing (Post-Script Name) | Script to execute AFTER data upload ends | Script to execute AFTER data upload ends | Script to execute AFTER data upload ends | Script to execute AFTER data upload ends |

| Layout Id | Source Column | Data Catalog Id | Friendly Name | Column Type | Internal Mapped column in CDMF | User entered ETL formula | Internal (converted) expressed in terms of CDMF columns | Any dynamic script to update column | KPI Y/N? |
|---|---|---|---|---|---|---|---|---|---|
| INPUT-S01 | A | DE023 | Serial No | Sequence | ISN | | | | N |
| INPUT-S01 | B | DE024 | Measured On | Metric Date | MDATE | | | | N |
| INPUT-S01 | C | DE025 | Region | Attribute | attrib01 | | | | N |
| INPUT-S01 | D | DE026 | Product | Attribute | attrib02 | | | | N |
| INPUT-S01 | E | DE027 | Sales Amount | composite data | datval01 | | | | N |
| INPUT-S01 | F | DE028 | Overhead | composite data | datval02 | | | | N |
| INPUT-S01 | G | DE029 | Commission Paid | composite data | datval03 | | | | N |
| INPUT-S01 | H | DE030 | NET SALES | Formula - Derived Data | datval04 | = (DE27-DE28-DE29) | = (datval01-datval02-datval03) | | Y |
| INPUT-S01 | | DE031 | COMMISSION PERCENT | Formula - Derived Data | datval05 | = (DE29 / (DE27-DE28))% | = (datval03 / datval01-datval02) )% | | Y |
| INPUT-S01 | | DE032 | AVG COMMISSION | Formula - Aggregate Expression | UNBOUND | | | | Y |

FIG. 4a

| Layout Id | Source Column | Data Catalog Id | Friendly Name | Column Type | Internal Mapped column in CDMF | User entered ETL formula | Internal (converted) expressed in terms of CDMF columns | Any dynamic script to update the column | KPI Y/N? |
|---|---|---|---|---|---|---|---|---|---|
| INPUT-SO2 | A | DE067 | Serial No | Sequence | ISN | | | | N |
| INPUT-SO2 | B | DE068 | Measured on | Metric Date | MDATE | | | | N |
| INPUT-SO2 | C | DE069 | Warehouse Name | Attribute | attrib03 | | | | N |
| INPUT-SO2 | D | DE070 | Product | Attribute | attrib04 | | | | N |
| INPUT-SO2 | E | DE071 | Qty | composite data | datval06 | | | | N |
| INPUT-SO2 | F | DE072 | Days in shelf | composite data | datval07 | | | | Y |
| INPUT-UO1 | A | DE080 | Serial No | Sequence | ISN | | | | N |
| INPUT-UO1 | B | DE081 | Measured On | Metric Date | MDATE | | | | N |
| INPUT-UO1 | C | DE082 | Commented By | Attribute | Attrib05 | | | | N |
| INPUT-UO1 | D | DE083 | Comment | composite data BLOB | blobval01 | | | | N |

| Layout Id | Source Column | Data Catalog Id | Friendly Name | Column Type | Internal Mapped column in CDMF | User entered ETL formula | Internal (converted) expressed in terms of CDMF columns | Any dynamic script to update the column | KPI Y/N? |
|---|---|---|---|---|---|---|---|---|---|
| INPUT-U01 | | Does not belong to data catalog | Sentiment | From Training Set T078 | Not Applicable. Fetched from training set | | | | N |
| INPUT-U01 | | DE084 | Likely to Buy % | Formula - Derived Data from AI/ML | | | | | Y |
| INPUT-IoT-01 | A | DE088 | Serial No | Sequence | ISN | | | | N |
| INPUT-IoT-01 | B | DE089 | Measured On | Metric Date | MDATE | | | | N |
| INPUT-IoT-01 | C | DE090 | Patient Id | Attribute | Attrib06 | | | | N |
| INPUT-IoT-01 | D | DE091 | Sensor Id | Attribute | Attrib07 | | | | N |
| INPUT-IoT-01 | E | DE092 | Sensor Type | Attribute | Attrib08 | | | | N |
| INPUT-IoT-01 | F | DE093 | Set Point Reading | composite data | datval08 | | | | N |

| Layout Id | Physical File Name | ISN | MDATE | Attrib01 | Attrib02 | Attrib03 | Attrib04 | Attrib05 |
|---|---|---|---|---|---|---|---|---|
| INPUT-S01 | Sales01.xls | 4567 | 7-Jul-15 | Europe | iPhone | | | |
| INPUT-S01 | Sales01.xls | 4568 | 8-Jul-15 | Asia | Samsung | | | |
| INPUT-S02 | Whse01.xls | 5367 | 7-Jul-15 | | iPhone | Zurich | | |
| INPUT-S02 | Whse01.xls | 5368 | 8-Jul-15 | | Samsung | Peking | | |
| INPUT-U01 | Twitt01.xls | 6711 | 7-Jul-15 | | | | John M | I am unsure of this auto insurance. Cant decide if this is good. However, let us give it a try |
| INPUT-U01 | Twitt01.xls | 6712 | 8-Jul-15 | | | | George A | Sound good - I hate current auto insurance, so it is worth contacting them |
| INPUT-IoT-01 | Dacs01.msg | 8981 | 7-Jul-15 | | | | | |
| INPUT-IoT-01 | Dacs01.msg | 8982 | 7-Jul-15 | | | | | |

| Attrib06 | Attrib07 | Attrib08 | datval01 | datval02 | datval03 | datval04 | datval05 | datval06 | datval07 | datval08 | datval09 |
|---|---|---|---|---|---|---|---|---|---|---|---|
| | | | 29000 | 900 | 300 | 27800 | | | | | |
| | | | 18000 | 800 | 250 | 16950 | 530 | 32 | | | |
| | | | | | | | 760 | 34 | | | |
| | | | | | | | | | 32% | | |
| | | | | | | | | | 68% | | |
| P015637 | RTD-023 | RTD Temp Sensor | | | | | | | | 98.4 F | 104.2 F |
| P090891 | RTD-036 | RTD Temp Sensor | | | | | | | | 99.2 F | 100.1 F |

FIG. 5b

SALES Data Layout (INPUT-01)

| Serial No | Measured On | Region | Product | Sales Amount | Overhead | Commission Paid | Commission Percentage % | AVERAGE Commission |
|---|---|---|---|---|---|---|---|---|
| 1 | 7-Jul-15 | Europe | iPhone | 29000 | 900 | 300 | 1.07% | |
| 2 | 8-Jul-15 | Asia | Samsung | 18000 | 800 | 250 | 1.45% | |
| | | | | 47000 | 1700 | 550 | 1.21% | 1.21% CORRECT |
| | | | | | | | 1.26% | 1.26% WRONG |

Illustrating the use of "aggregate expressions"

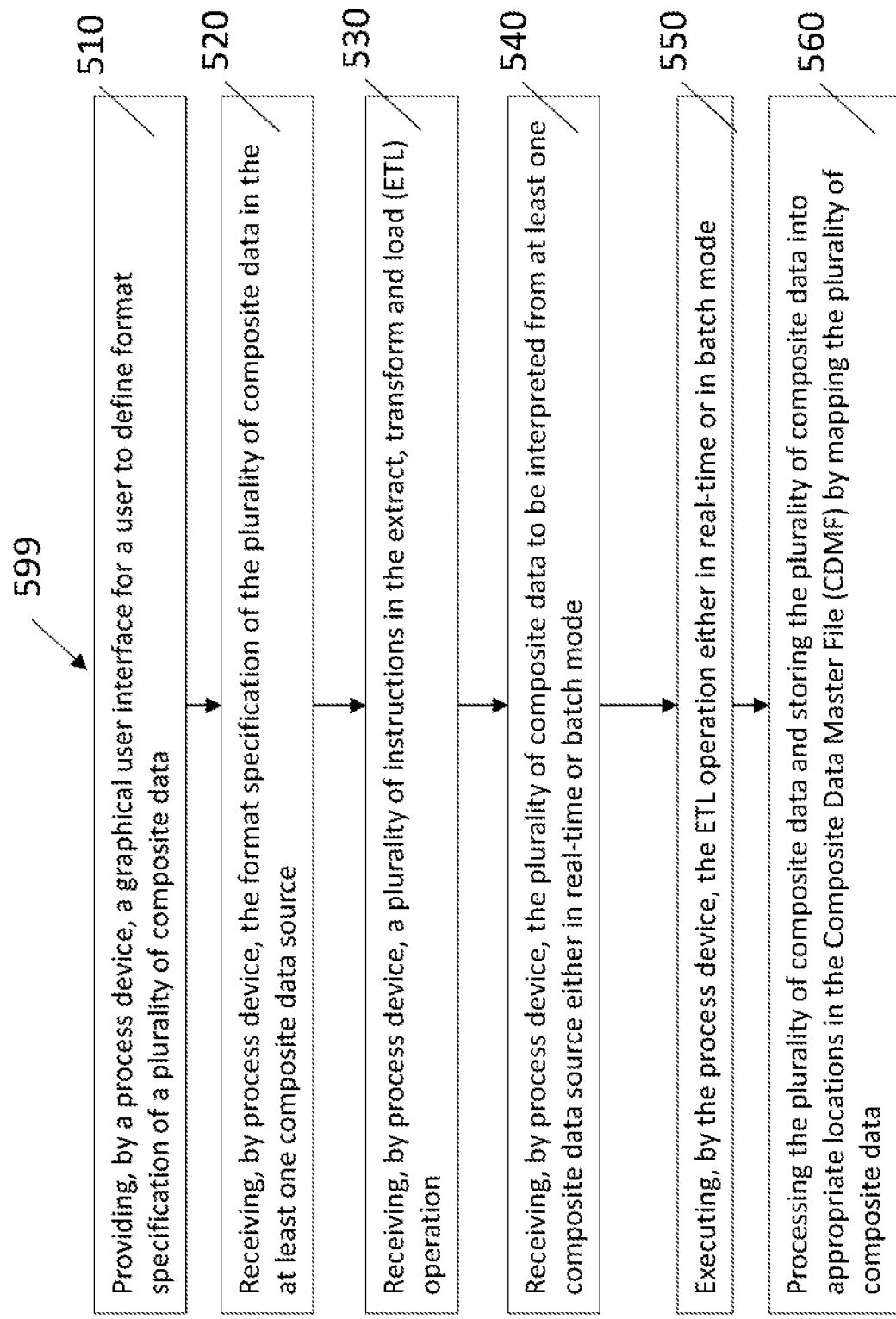

LAYOUT DEFINITION SCREEN
Manage Source Data Templates

Here are the current layouts for incoming composite data:
Click on Layout Id to view or modify Layout Details...

| Layout ID | Layout Name | How often? | Input Mode | File Upload Status |
|---|---|---|---|---|
| INPUT-S01 | SAP Sales data | Weekly | Batch - CSV | 14 files (click to view details)... |
| INPUT-S02 | Warehouse data | Daily | Batch - CSV | 6 files (click to view details)... |
| INPUT-U01 | Twitter Feed | Daily | Batch - Text | 5 files (click to view details)... |
| INPUT-U01 | Real-time Patient Data | Daily | Real-time | Start: 9:00 AM End: 9 PM (click to view details)... |

Define New Source Data Template below:

Layout ID: INPUT-U03    Layout Name: FaceBook-U03

How often? Monthly ▶    Input Mode: Batch - CSV ▶

Script name to execute PRIOR to loading: FacebookSentiment.java

Script name to execute AFTER loading: Mashup01.java

Submit

LAYOUT DETAILS SCREEN — Manage Source Data Elements

CHOSEN LAYOUT: INPUT-S01 SAP SALES DATA

| Col | Column Name | Column Type? | Input Format | Enter Formula / Command |
|---|---|---|---|---|
| A | Seq No. | Sequence # ▶ | String ▶ | |
| B | Measured On | Metric Date ▶ | Date ▶ | |
| C | Total Sales Booked | Raw Data ▶ | $99,999.99 ▶ | |
| D | Gross Profit | Derived Data ▶ | $99,999.99 ▶ | = sum(C) – sum (E) |
| E | Cost Incurred | Raw Data ▶ | $99,999 ▶ | |
| F | Cost as a % of Sales | Aggregate Exp. ▶ | 99.99% ▶ | =sum(E)/sum(C) * 100; IF >70% MARK RED; |
| G | Region | Reporting Category ▶ | String ▶ | |

Add more columns:

| H | | Sequence # ▶ | String ▶ | |
| I | | Sequence # ▶ | String ▶ | |
| J | | Sequence # ▶ | String ▶ | |

Submit

METRIC DEFINITION — 580

133 → Metric Name: KPI001 ⌄  Freight/ Material Cost Ratio

Metric Owner: ⌄

Executive Sponsor: Woody Eisenberg ⌄    Metric Units: $9,999.99

Metric Category: Availability ⌄    Map to Balanced Scorecard: Finance ⌄

This is a : Goal (Lead) Metric ⌄    Reporting Interval: Monthly ⌄

Aggregation Factor: Sum ⌄

Map to Qualitative Parameters

Belongs to Strategy: Increase Predictability ⌄    Business Unit: Far East Business ⌄

Business Process: Critical Situation Assess ⌄    Six Sigma Category: Critical to market ⌄

YTD review : Yes ⌄    Computer Variance: - Select Variance From ⌄

Audit Chapter: ⌄    Audit Element: Sum ⌄

Submit

FIG. 10a

PICK AI/ML ALGORITHM FROM LIBRARY
CHOSEN LAYOUT: INPUT-S01  SAP SALES DATA
OUTPUT TO COLUMN: G – Likely to Buy %

AI/ML Algorithm Type: Supervised ▶

- Supervised
- Unsupervised
- Reinforced Learning
- Neural Network

Select AI/ML Algorithm: Naive Bayes ▶

- Support Vector Machine
- Naive Bayes
- Random Forest
- Ordinary Least Squares (OLS)
- Decision Tree
- Linear Regression
- K-Means Pick Training set to use: Standard Gaussian Assumption Distribution Set ▶

- MyAutoCo Generated Custom Training Set 1 – Latest version
- myAutoCo Custom Training Set prior to Jan-2011 to Dec 2018
- Standard Gaussian Assumption Distribution Set
- Our Competition Benchmark (Naive Bayes) Training Set Input parameters as Name:Value pair: LabeledPoint:xxx; LambdaVal:yyy; Smooth:Yes; iterations:200;

Script name to execute AFTER AI/ML runs: ComputeBuyPercent.java

Update existing Training set after learning: ● Yes  ○ No

Create New Training set copy: SaveRunCopy1.Trn

Submit

SYSTEM AND METHODS FOR USER-CONFIGURABLE VIRTUAL APPLIANCE FOR ADVANCED ANALYTICS USING STREAMING/IOT/BIG DATA

CROSS-REFERENCE RELATED TO RELATED APPLICATIONS

None.

BACKGROUND

For decades, senior business executives have been collecting and monitoring their metrics aka KPI (Key Performance Indicators) and making decisions using metrics. Until recently, all such metrics have been operational metrics, which give information about daily/weekly/monthly business performance—typically what has "happened in the past". Operational metrics are computed using the plurality of composite data in structured format, having fixed columns, fixed width and well-defined data types (ex: CSV files, having comma separated values) collected from various source systems. Such source systems typically track transactions in sales, marketing, finance, supply chain, manufacturing, project management and quality etc., But in the past few years, the field of advanced analytics has emerged, which involves two distinctions from the operational metrics mentioned above. One, the source data may not always be in a structured format, but also contain unstructured, free-flowing text which do not have fixed width or fixed columns, but free-form data, such as but not limited to twitter feeds, machine logs, user comments, news feeds etc., Unstructured data can also be signals, as opposed to binary data or textual data, signals such as wave signals, radio frequency (RF) signals from missiles, airplanes and torpedoes, Internet of Things (IoT) signals from devices like robots and instruments etc. Unstructured data may also be streaming in real-time, as opposed to one-time bulk, batch files (such as but not limited to CSV, JSON, XML) which are used in operational metrics above. Second, Advanced analytics results and predictions are "futuristic"—not just "what happened in the past" as in the case of operational metrics. Also, it is important to note that the "advanced analytics results" is also a form of metric—the results of AI/ML algorithm execution are also a kind of measurement. Hence throughout this document, the definition of the term "metric" or "metrics" comprises not only operational metrics, but also include the result of analytics algorithm execution, or the findings extracted from analytics applications.

As mentioned above, data can be structured, unstructured and streaming signals, or a combination of all the three types for the purposes of advanced analytics, a combination of these data are used extensively. Until now, there has been distinctive treatments for each of these data types, with distinctive tools. It is important to note that, in every advanced analytics application, the end user has to unavoidably deal with "composite data". Even though advanced analytics deals with unstructured and streaming data predominantly, there will always be some structured data needed for comparison, making predictions and computing metrics. In short, all data for advanced analytics applications will invariably involve "composite data". Finally, to add more meaning to the term "composite data" the data involves large data sets and includes all big data.

In a typical business environment, it is undeniable that amazing business insights can be derived using latest Artificial Intelligence and Machine Learning (AI/ML). By collecting and feeding composite data into AI/ML algorithms and neural networks, it yields phenomenally revealing insights and futuristic predictions—insights that were utterly impossible to get using conventional methods. Furthermore, very informed and very timely decisions can be made using composite data by operating custom-designed advanced analytics applications using AI/ML algorithms.

Machine learning algorithms fall into three categories: supervised learning, unsupervised learning and reinforced learning methods. In the case of supervised learning, the algorithms operate based on "previously acquired knowledge" or "training sets" where different pre-defined patterns are stored. In short, the AI/ML algorithms look for pre-defined patterns, or "machine learning models" for making the predictions and inferences, especially from huge data sets, making it very easy to find needle in haystack! These algorithms, when they execute, they look at the incoming data pattern and match them against their stored training set to make predictions. Richer the training set, the better the predictions from analytics. Such supervised learning systems become more and more intelligent with every iteration of use. And the training set embellishes itself in its richness as time goes on. In many instances, the training sets are tweaked by manual methods or using programming.

The output and the results of the advanced analytics are presented in the form of graphs, dashboards etc., In the case of operational metrics, the dashboards are created to display weekly/monthly/quarterly time trends, pie charts, pivot charts etc., But when the plurality of composite data and AI/ML algorithms are used on big data in real-time, the dashboards have to be highly responsive, very sophisticated and display real-time trends as the occur, with minimal time lag.

Every software program or routine expects a set of input parameters to be supplied in order to execute. After processing, the algorithm produces results via output parameters. Similarly, every AI/ML algorithm requires its own set of input parameters, and optionally, in the case of supervised learning programs, it also requires the use of appropriate training sets. Every AI/ML algorithm requires its own unique way of specifying input/output parameters. A standardized and easy way to pass such input and output parameters has so far not been achieved.

In the case of military threat detection systems —detecting sonar signals and predicting combat missiles and objects, the system has to predict many possibilities and present the options along with their probabilities. The operator then can choose the best prediction among the options. Also, in the case of an instrumentation system such as a chemical plant with hundreds of sensors sending IoT signals, after running AI/ML algorithms and control loops, the output control signals have to be sent to the control values in real-time. In the case of real-time streaming applications also, which operate like control systems, analytics results are sent back to the controlling devices.

It is to be noted that the term "end user" as defined here, is the ultimate beneficiary of the advanced analytics results (aka metrics), or the one who runs the analytics applications to derive results. The end users typically work in conjunction with the software developers and data scientists. Often, they wait for the software developers or data scientists to design a new solution, download a new dataset, and come up with predictions, which the end-user would use to elicit the business context, business impact of those analytics results and make meaningful, informed business decisions. It is important to note that, in the current industry practice of writing AI/ML code with Python R etc., and other similar languages, the input and output parameters do not follow a standardized pattern. Each has its own way of parameter passing mechanism. This is decided at will by the programming person, or the data scientist, as it is all done via programming today.

Regardless of the type of analytics application, all advanced analytics applications follow a defined methodology or a set of well-defined steps or stages during their design process. It is very important to note two things: one, each stage requires a "developer tool" of its own. A developer tool could be a programming language or a set of application programing interfaces (APIs) or an interactive tool, to be used by developers. Second, each of those developer tools are used by trained developers who are certified in the respective languages or tools—and not the end users. Regardless of the type of business, and regardless of the types of data (structured/unstructured/streaming IoT signals) and whether in real-time or not, all advanced analytics applications follow some or all of these seven stages: 1) data extraction or data ingestion, 2) data cleansing or signal smoothing and data integration 3) storing composite data in real-time into the database in memory as the big data arrives in large chunks at high speed 4) performing metrics calculations or running AI/ML algorithms as appropriate 5) sending control signals back to the control devices in the case of IoT and signals as a result of the execution of the AI/ML algorithm 6) creating artifacts like charts, reports and dashboards both for real-time viewing as well as end-of-week and end-of-month management dashboards and 7) a team of experts looking at the results of analytics, collaborating and commenting on the results and business impacts, addressing issues, throwing action items and making decisions.

An end-to-end digitized framework which an end user design on their own and operate the seven steps advanced analytics applications on the user's own has not emerged. A brief explanation of each of the seven steps follows:

Stage 1: Data extraction and ingestion: There are three sub-aspects to this first step, which is collecting data from different sources. Data, as we refer to here is "composite data". Today, there is NO single software tool, for the end users, that can handle "composite data". Structured data is handled using industry ETL (Extract, Transform, Load) tools which are used by developers not end users. Industry ETL tools like Informatica, Oracle etc., have been around for decades, and they handled only structured data exclusively. To handle unstructured data, there are tools like Spark, Splunk etc., To handle messages, signals and IoT, typically the tool used is Apache Kafka or its commercial variations such as Confluence. It is to be noted that ALL these tools are developer tools, requiring special programming knowledge training and resources. These tools are not meant for end-users, who wish they could write metrics formulas on their own, like excel formulas for example.

Stage 2: Data cleansing and aggregation: This step is accomplished by using the same developer tools as mentioned in the previous stage. It is to be noted that these two steps are accomplished using custom software development. In fact, all the rest of the steps that are going to be explained below all require developers and their subject matter expertise (SME).

Stage 3: Storing streaming data in real-time into the database: For storing structured data (CSV—comma separated values) or XML or JSON files, we typically use relational database systems like Oracle, SQL Server etc., On the other hand, for storing streaming data and signal information, we use distributed files systems (not relational file system) like Spark and Splunk etc., In addition, there are special variations if the data you are writing to the database is "big data" in real-time. This step involves TWO aspects: one, having to design a custom database schema and two, there is a need to write custom software code to write to the database and/or configure and tune the database to receive data in real-time. Again, these are done by developers, as a custom exercise, one each, for every application. So, a unique, universal and ready-to-use data structure that can simultaneously depict the qualities of both a relational and distributed file system has not emerged. In addition, there is a proliferation of data cubes, data lakes etc., which are subsets of big databases, since the end users are not given direct access to data. This creates another huge overhead to manage such subsets of data, for different business purposes.

Stage 4: performing metrics calculations and/or executing AI/ML algorithms: This step breaks down to two sub-categories: for structured data (CSV, JSON or XML), this step involves developing metrics that are relevant to the business needs, organizing metrics from KPI level and cascading down to tactical levels. Also involved in this step is the need to define Red/Amber/Green limit sets for the metrics. Every metric is also mapped to the respective attributes such as the region, product or business drivers, functions and priorities, as well as the respective metrics owners, who are responsible for delivering the metrics, and the metrics consumers, who are responsible for making use of the metrics. Again, all structured metrics calculations are done using custom software development. So much for the metrics calculations for structured data. For unstructured data, as well as data that requires AI/ML predictions, first, the appropriate AI/ML algorithm is selected and a model is built. Some algorithms also require respective training sets. All of this is done via programming, using languages like Python or R as the popular ones, by data scientists. There is NO single tool that allows the end users to pick and choose a particular AI/ML algorithm, from a library of algorithms, and call the algorithm like a black-box, by supplying the respective parameters. It is also important to note that the training sets are tweaked by developers as the system evolves.

Stage 5: Sending control signals as a result of the execution of the AI/ML algorithm in the case of signals and IoT: for example, imagine a system that receives all signals from combat missiles, and detecting which country the missile originates from. Or think of a system detecting torpedo signals and identifying the type of the torpedo in question. Or think of an instrumentation system which is receiving IoT signals from sensors—thermocouples, pressure sensors etc., In all these cases, after receiving the signals, the system executes an AI/ML algorithm and it outputs certain results and/or predictions, which are sent back to the control devices. It is done solely by custom programming. There is no tool today that would help accomplish this step. Even it existed, it would most likely be another "programmer-only" tool, and not an end-user tool.

Stage 6: Creating artifacts like dashboards, charts and reports: Again, this is different for structured vs. unstructured and streaming real-time data. In the case of streaming real-time data, dashboards have to display changing trends in real-time, of course with some processing delays. In the case of structured data, these are operational metrics dashboards, created typically using tools like Tableau, Qlik and Power BI by Microsoft. All these tools are developer tools and APIs, most of which may not readily cater to the needs of big data in real-time. It is to be noted that these dashboards are created by certified BI developers working on pre-defined data sets, data cubes and data lakes.

Delving further into the stage 6 above, specifically for charts and dashboards, there are three sub aspects that must be noted: a) the charts and dashboards contain data grids which are achieved by programming and bringing the details b) the charts require slice and dice by attributes, different means. Even this requires extensive programming. There is no automatic or intuitive "three-way drill down" that has been achieved, without the use of programming code, which is discussed below. For example, a chart may display the Net Freight Amount for a country like USA, which could be sliced and diced in terms of the month, the freight carrier, the product being shipped etc., which are all attributes. c) Context-sensitive three-way drill downs: Starting with the metric Annual Net Freight Annual Amount, one can drill down in three ways: either as attribute-wise, drill down on Net Freight Amount per product, per state within USA, or per freight carrier or a combination thereof. Or, the user can drill down from the annual amount and view the time series, the amount broken down into quarters, months or weeks or days. Staring with the Net Annual freight, the user can request to see the weekly or monthly or quarterly breakdown amounts. Or, the end user can drill down component-wise—meaning, break down the Net Freight Amount into its components such as Total Freight minus the Freight recoveries minus any Freight Discounts and the user can see all such components of the Net Freight Amount metric. It is important to note that, in all these three drill downs, it is the developers who have to write custom code to achieve this functionality, for every type of metrics and every type of chart.

Stage 7: A team of experts end users looking at the charts and collaborating to make decisions: Once the charts and dashboards are developed, or the system suggests control scenarios or output signals (in the case of IoT) the charts then get routed to different user roles and the user share comments, raise and resolve formal issues, throw action items and track hem and make decisions. In some cases, upon observing the metrics and the impacts, users can also initiate a formal "root cause analysis" process. It is emphasized here that the seven steps mentioned above each require a developer tool or a programming tool, which can only be used by trained software developers—and not by the end-users.

The unavoidable use of these seven layers of developer tools is not without a reason. So far, the industry has not been able to arrive at a unified general-purpose appliance, because of these reasons: a) In every case, the underlying source data structures are very different. In every organization, the different business functions have their own systems, each having its own custom database schema. Therefore, the aggregation of data from these systems were unique to every business need. So, a "universal data warehouse" that can capture and process all data (structured/unstructured/streaming IoT and signals) into one readymade schema does not exist. Specifically, there is no universal data warehouse today that can be configured by end-users without having to know database design concepts. b) Since a universal data warehouse does not exist, there is no unified SQL structure or specification that can process tables and columns which in turn can house all types of data (structured/unstructured/streaming IoT and signals) does not exist either.

For example, there are attempts like "kSQL" sitting on top of Apache Kafka implementations. Even if they succeed, such "kSQL" like systems would only be used by software developers, not end-users. c) Today, in order to handle all types of data, a combination of SQL queries for structured data (in tables and columns) and search algorithms for unstructured and message queues will have to be written by developers. And also, there is still a need that exists for "logical data model" and the issues of "space optimization" and "cost optimization" of SQL queries and search algorithms. And it results in denormalization of the data model or "flattening out the logical schema"- to achieve such optimization needs. So far, a generic denormalized data model has not emerged, that can house all types of data (structured/unstructured/streaming signals IoT). Today sadly, developers achieve it with a relational data model for structured data, and they use a distributed data model for unstructured data, and they use message queues for streaming data. These are schemas, designed individually for every analytics application. d) Today, for data extraction and cleansing, even though interactive ETL (extract transform load) commands exist from companies like Informatica, Oracle etc. they serve the needs of structured data and not for unstructured data, and also they have API (Application Programming Interface) calls that the programmers use in order to achieve data cleansing data aggregation and cross-referencing. A unified ETL model, that can be used by end-users with English-like commands, to extract and process the incoming "composite data", without any need to do programming, has not emerged. e) All calculations of metrics, cascading of metrics and red/amber/green alerts and notifications have to be done using custom software programming f) Users today do not have the luxury of picking an algorithm of their choice from a centralized AI/ML library, as appropriate to their business need, passing parameters treating the AI/ML algorithm as a black box, without having to know its inner workings g) Today, there are no avenues for end users to operate and enhance in an offline setting with the training sets and tweak them make them more intelligent for use like "train the trainer" h). Today there is no standardized way to send control signals as a result of the execution of the AI/ML algorithm that can be readily used by end users i) As the data sets change and as the need for different charts arise, there is no direct way for end users to create new visualizers on their own, without the help of certified BI tool developers like Tableau, Qlik, Power BI etc., j) Such charts, even though they yield very attractive visualization, there is no standardized way to collaborate with comments, issues, action items and meetings or initiate a formal root cause analysis process. Today, all collaboration on the results of advanced analytics happens in free form. There is no formal collaboration module exclusively meant for analyzing the impact of metrics and insights coming out of advanced analytics applications.

Having explained the seven stages of advanced analytics applications, it is important to note two aspects: a) today, these seven stages cannot be performed using one tool, even by developers. Today it requires many software tools and software development expertise in those individual tools, to develop an analytics application from scratch. b) Today, there exists no single end-to-end digitized tool that can be set up, configured, put into practice, monitored and used directly by end users. In short, a virtual appliance that can be used like a black box by the end users does not exist. Instead, every enterprise implements its own custom solution, for every analytics problem, each one specific to their business need, using a myriad of developer tools and APIs, and creating a loosely tied framework, glued together with a lot of manual hand-offs between the different stages mentioned above. It all involves a lot of custom application development code in many languages, and it creates a huge burden on IT (Information Technology) SMEs for software development, ongoing support and enhancements.

In other words, in the current information industry, there is no general purpose, configurable end-to-end solution that can serve as:
- a metrics/advanced analytics data collection tool for all types of data ("composite data")
- aggregate and cross-reference composite data using one set of user-driven commands
- a single centralized, prebuilt repository, with a ready-made schema that has the flavor of relational structure as well as distributed file system, that can process big data as it arrives in real-time and store it into the central repository
- execute preconfigured AI/ML algorithms and metrics rules by treating and calling them as a black box
- allowing the "train the trainer" mechanism to manage and enhance training sets, by the end user
- optionally piping the results to controlling device in the case of IoT and other signals
- showing it in streaming charts and dashboards
- offer a formal collaboration engine that all the business users can avail, to make informed decisions based on analytics, and store the results automatically for compliance purposes.

In conclusion: 1. A single end-to-end digitized software platform has not yet emerged, that can automate all the above seven aspects of advanced analytics applications, regardless of their business domain under one umbrella. 2. A single tool has not emerged that can handle "composite data" for advanced analytics applications. 3. A single, digitized virtual appliance has not emerged that can be configured and operated by the users, of the users, for the users. This innovation remediates all of these three deficiencies into one cohesive platform, eliminating or drastically cutting the burden on IT developers and skillsets and skillset shortage. And in each of the three steps, there are sub aspects and nuances that are innovative that are a shift from current industry practice.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims. The subject matters of this application overcomes the aforementioned problems and is directed to a system for integrated performance measurement environment comprises a plurality of composite data from a plurality of composite data sources, wherein the plurality of composite data further comprises a plurality of structured data, a plurality of unstructured data, and a plurality of signal data; an extract transform load module in a memory of a process device, extracting, transforming, and loading the plurality of composite data from a plurality of composite data sources, wherein the extract transform load module further comprise a layout definition module storing one set of data layouts, a data unification module comparing the plurality of composite data with the set of data layouts in the data unification module, a data reception module to receive the plurality of composite data from the plurality of composite data sources into the extract transform load module, a data upload and correction module generating a plurality of rejected records and a plurality of rejection reasons where the plurality of composite data inconsistent with the set of data layout, a real-time database writer module writing the plurality of composite data as a plurality of stored data into a database, and a real-time streaming monitor module monitoring a transmission of the plurality of composite data and providing an alert when the transmission is interrupted or the transmission is not in accordance with a predefined schedule; a database receiving the plurality of composite data from extract transform load module and storing the plurality of composite data as the plurality of stored data, wherein the database further comprises a layout details table, a layout definition table, and at least one composite data master file; a business logic module in the memory of the process device allowing a plurality of operations on the stored data, wherein the business logic module further comprises a metrics catalog definition module, an artificial intelligence and machine learning (AI/ML) algorithm library, a training set repository module, an Internet of Things (IoT) Control Signal module, a business intelligence block module, and a collaboration module, wherein the metrics catalog definition module further comprises a plurality of metrics catalogs, wherein the business intelligence block module further comprises a plurality of business intelligence blocks; at least one graphical user interface in the memory of the process device, wherein the at least one graphical user interface displays a configuration to identify the plurality of composite data sources, wherein the at least one graphical user interface can respond to an input to the configuration to identify the plurality of composite data sources, wherein the at least one graphical user interface displays a set of instructions of the extract transform load module, wherein the at least one graphical user interface can respond to a request to select the set of instructions of the extract transform load module, wherein the at least one graphical user interface displays the business logic module, wherein the at least one graphical user interface can respond to an operation to select the plurality of metrics catalogs and the plurality of business intelligence blocks; a set of graphical presentations of a plurality of processed data comprising charts, graphs, reports, and tables, and a combination thereof on a computer device; and at least one network capable of transmitting the plurality of composite data from a plurality of composite data sources to the process device and transmitting the plurality of processed data to a computer device.

BRIEF DESCRIPTION OF THE DRAWINGS

It should be understood that the drawings are merely representative, are not necessarily drawn to scale, and are not intended to limit the subject matter of this application.

FIG. 2a illustrates one of the embodiments for a composite data comprising structured data.

FIG. 2b illustrates one of the embodiments for a composite data comprising structured data.

FIG. 2c illustrates one of the embodiments for a composite data comprising unstructured data.

FIG. 2d illustrates one of the embodiments for a composite data comprising signal data.

FIG. 3 illustrates one of the embodiments of the Layout Definition table of the subject invention.

FIG. 4a illustrates one of the embodiments of the Layout Details table of the subject invention.

FIG. 4b illustrates one of the embodiments of the Layout Details table of the subject invention (continued).

FIG. 4c illustrates one of the embodiments of the Layout Details table of the subject invention (continued).

FIG. 5a illustrates one of the embodiments of the Composite Data Management File (CDMF) table of the subject invention (first half).

FIG. 5b illustrates one of the embodiments of the Composite Data Management File (CDMF) table of the subject invention (second half).

FIG. 5c illustrates an example of aggregation calculation from the stored data from Composite Data Management File (CDMF) table.

FIG. 6 is a flow chart diagram of a method for the extract transform load (ETL) operation process in accordance with an aspect of the present invention.

FIG. 7 illustrates an exemplary graphical user interface for user's definition of layout (Layout Definition Screen) of raw data source in accordance with an aspect of the subject invention.

FIG. 8 illustrates an exemplary graphical user interface for user's definition of layout details of a given data layout definition raw data source in accordance with an aspect of the subject invention.

FIG. 10a illustrates an exemplary graphical user interface for user's definition of metrics catalog in accordance with an aspect of the subject invention.

FIG. 10b illustrates an exemplary graphical user interface for user's selection of AI/ML Algorithm from AI/ML Algorithm Library in accordance with an aspect of the subject invention.

DETAILED DESCRIPTION OF THE PREFERRED EMBODIMENT

Figure 1A:
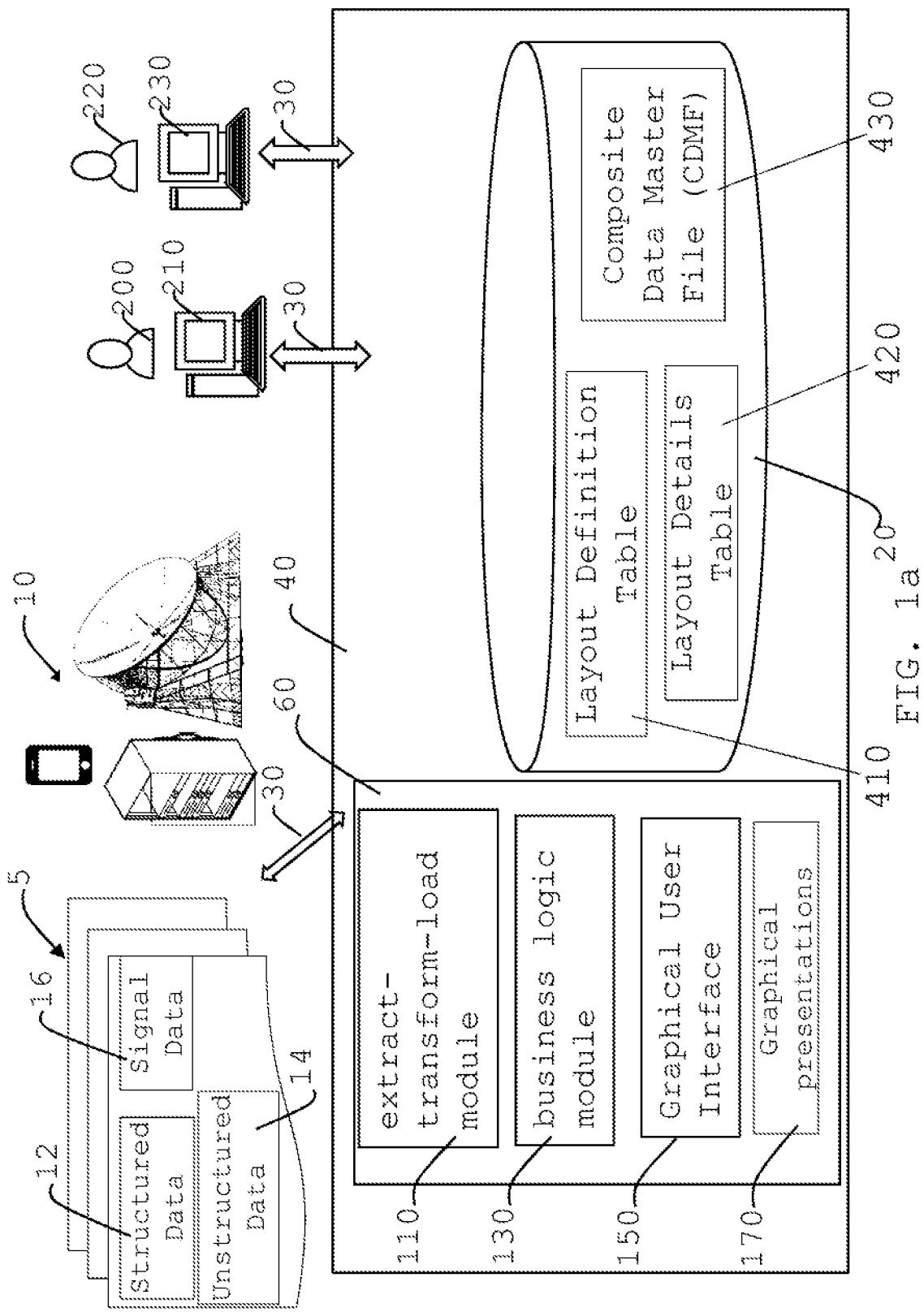
FIG. 1a shows a schematic diagram of a system for management control components in accordance with an aspect of the subject invention.

Referring to FIGS. 1a, 1b, 2a, 2b, 2c, 2d, a preferred embodiment of a system for integrated performance measurement environment, which comprises a plurality of composite data 5 from a plurality of composite data sources 10, wherein the plurality of composite data 5 further comprises a plurality of structured data 12, a plurality of unstructured data 14, and a plurality of IoT signal data 16; an extract transform load module 100 in a memory 60 of the process device 40, extracting, transforming, and loading the plurality of composite data 5 from the plurality of composite data sources 10; a database 20 receiving the plurality of composite data 5 from extract transform load module 100 and storing the plurality of composite data 5 as the plurality of stored data 22 in a Composite Data Mater File table (FIGS. 5a and 5b), wherein the database 20 further comprises a layout details table 420, a layout definition table 410, and a composite data master file 430; a business logic module 130 in the memory 60 of the process device 40, which allows a plurality of operations on the stored data 22; at least one graphical user interface 150 in the memory 60 of the process device 40, wherein the at least one graphical user interface 150 displays a configuration to identify the plurality of composite data sources 10, wherein the at least one graphical user interface 150 can respond to an input to the configuration to identify the plurality of composite data sources 10, wherein the at least one graphical user interface 150 displays a set of instructions of the extract transform load module 110, wherein the at least one graphical user interface can respond to a request to select the set of instructions of the extract transform load module 110, wherein the at least one graphical user interface 150 displays the business logic module 130, wherein the at least one graphical user interface 150 can respond to an operation to select the plurality of metrics catalogs and the plurality of business intelligence blocks; a set of graphical presentations 170 of the plurality of processed data comprising charts, graphs, reports, the network 30 capable of transmitting the plurality of composite data 5 from the plurality of composite data sources 10 to the process device 40 and transmitting the plurality of stored data 22 from the process data to a computer device.

Figure 1B:
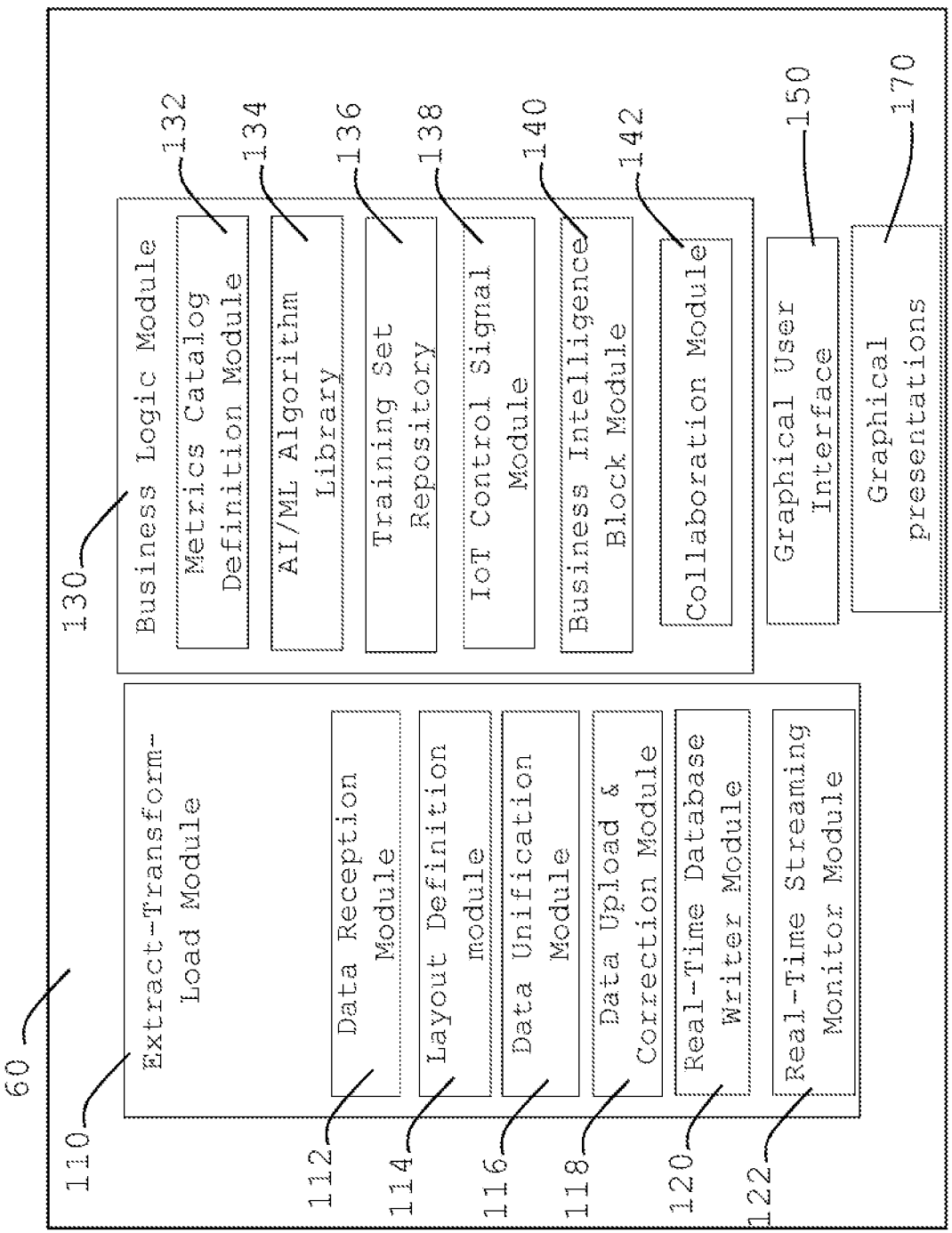
FIG. 1b shows a schematic diagram of a system in part for management control components in accordance with an aspect of the subject invention.

Referring to FIG. 1b, the extract transform load module 110 further comprises a data reception module 112 to receive the plurality of composite data 5 into the extract transform load module 110, a layout definition module 114 storing one set of data layouts of the plurality of composite data 5 that can be predefined by a user 200; a data unification module 116 comparing, an unifying as needed, by referring to the plurality of composite data 5 with the set of data layouts in the layout definition module 114, a data upload and correction module 118 processing and generating a plurality of rejected records and a plurality of rejection reasons where the plurality of composite data 5 are inconsistent with the set of data layouts predefined by the user 200; a real-time database writer module 120 writing the plurality of composite data 5 as a plurality of stored data 22 into the database 20; and a real-time streaming monitor module 122 monitoring the transmission of the plurality of composite data 5 and providing an alert when the transmission is interrupted or the transmission is not in accordance with a predefined schedule.

Referring to FIG. 2, FIG. 10a, FIG. 10b, FIG. 11, FIG. 12, one embodiment of the business logic module 130 further comprises a metrics catalog definition module 132, an artificial intelligence and machine learning algorithm (AI/ML) library 134, a training set repository 136, an Internet of Things (IoT) Control Signal module 138, business intelligence block module 140, a collaboration module 142; wherein the metrics catalog definition module 132 further comprises a plurality of metrics catalogs, wherein the business intelligence block module 140 further comprises a plurality of business intelligence blocks.

The plurality of structured data 12 may include data containing fixed width, fixed number of columns with formatted data. Examples of structured data are numbers, alphanumeric, characters only etc., which is typically received as comma separated values or spreadsheet files from a plurality of source systems that capture day-to-day transactions, such as sales, manufacturing, operations, finance, general ledger etc.

A plurality of unstructured data 14 may contain free-form, free-flowing data from the plurality of composite data sources coming in as batch files or streaming data in real-time, such as twitter feeds, user comments in Amazon, emails etc., which are neither in any specific format nor in fixed width and column specification. The plurality of IoT signal data 16 may be generated from a plurality of signal emitting devices, such as but not limited to missiles, airplanes, torpedoes or Internet of Things (IoT) signals, which could be formatted or subject to processing and converted to a structured format, and may contain timestamp against every tuple of data.

Also Referring to FIG. 1a, A database 20 receiving a plurality of composite data 5 assigns a plurality of attributes to the plurality of structured data 12, a plurality of unstructured data 14, and a plurality of IoT signal data 16. The database 20 comprises a universal relational database schema (URDBS) that further comprises a layout definition table 410, a layout details table 420, a composite data master file (CDMF) 430.

The extract transform load (ETL) module 110 comprises a data reception module 112, which receives the plurality of composite data 5 transmitted through the network 30 from the plurality of composite data sources 10 and keep the plurality of composite data 5 in staging data structures, ready for further processing. The data reception module 112 validates the plurality of composite data 5 according to the set of instructions defined in the data unification module 116, where a set of data layout definitions for the incoming data is redefined by a user 200. The data reception module 112 also works with the real-time database writer module 120, which writes the received composite data 5 to the database 20. It is to be noted that, in the case of live streaming, a copy of the CDMF 430 resides in memory all the time, to receive high-speed data coming in and to process or execute any chosen AI/ML algorithm from AI/ML algorithm library 134 it in real-time (FIG. 10b), and afterwards, being able to write to the database 20. The data reception module 112 also works with the real-time streaming monitor module 122, which ensures smooth data reception and any operator intervention by an user 200 via an graphical user interface 150. The data reception module 112 also works with the data upload and correction module 118, which displays rejected records along with the rejection reason that the end-user can download the bad records and fix them and reload them. The data reception module 112 will also compare the plurality of composite data coming currently with the plurality of composite data received previously to show any discrepancies between them. An alert is issued from the data reception module 112 to user 200 to show a discrepancy between the plurality of composite data coming currently and the plurality of composite data received previously. The data reception module 112 works either push or pull. Push is where the raw data files are dropped into the FTP repository, and pull is where a batch program (such as RESTFul WEB Service or a database connection script) executes to pull the data from source system. In push, the plurality of composite data 5 is pushed in a predefined schedule such as nightly, weekly, monthly into a storage space or a ftp site housed within the data reception module 112. The ETL module 110 also comprises a data upload and correction module 118, which looks for the file to be ingested, and it processes the incoming plurality of composite data, and validates and rejects as appropriate. And the data upload and correction module 118 passes control to the data unification module 116 as needed. For example, an IoT application monitors the temperature and pressure of an industrial boiler, which gives out IoT signals. The plurality of composite data are compared as per the definition given in the layout definition module 114. The data unification module 116 compared the plurality of composite data, and create a data structure to be written to the database 20, according to the rules given in the layout definition module 114.

The layout definition module 114 storing a set of data layout definitions is core to the entire operation of the ETL module 80. The user 200 predefines what data is, where is it coming from, who are the responsible people, what are the columns, or constituents of the data packet, and what type each data element piece pertains in the set of data layout definitions in the layout definition module 114. The user 200 specifies the set of instructions or English-like ETL commands such as how to validate the data, what computations to make, how to calculate metrics, what AI/ML algorithm needs to be picked etc. in the layout definition module 114 for the plurality of composite data go into layout definition table 410 and layout detail table 420 in the database 20. This process of defining the layouts ahead of time is called layout configuration. When the composite data 5 coming from the composite data sources 10 are do not comply with the data definition in the layout definition module 114, the Data Reception Module 112 prompts via the at least one Graphical User Interface 150, allowing a user 200 to decide whether to fix the record or manually reject it via Data Upload and Correction Module 118.

Referring to FIG. 2, in one of the embodiments, the business logic module 130 further comprises a metrics catalog definition module 132, which also defines the rules for calling a specific AI/ML algorithm from the AI/ML algorithm library 134, which may make use of a training set repository 136 for a supervised and reinforced AI/ML applications. Optionally in the case of processing of the plurality of IoT signal data situation, AI/ML algorithm library 134 may also make use of IoT Control Signal module 138. In all cases, a business intelligence (BI) block module 140 and a collaboration module 142 will handle the display, dashboard and associated discussion using the computer device 210 and/or computer device 230 for the user 200 and/or the user 220, either in a streaming fashion in real-time trend displays or for management dashboards as in end-of-week or end-of-month reporting. The graphical user interface 150 provides the users 200 and 220 the necessary functions to achieve it interactively.

Referring to FIG. 1b and FIGS. 10a and 10b, the metrics catalog definition module 132 allows the user 220 to define a plurality of metrics catalog 133 as on an graphical user interface 580 (FIG. 10a) for metrics catalog. The plurality of metrics catalog 133 defined by the user 220 fall into one of three kinds. First, the plurality of metrics catalog 133 can be the plurality of composite data. For example, the line items like sales and revenue are summarized over week, month, quarter etc., and sliced and diced by the attributes such as store, product, region etc. Second, the plurality of metrics catalogs 133 can compute or derive a plurality of processed data from a plurality of composite data by formula and got stored in a composite data master file (CDMF) 430 during data upload into the CDMF 430. Third, the plurality of metrics catalog 133 can be an aggregate expression, which is a formula that can return a number, which is not stored in CDMF, but computed on the fly. The presentation of derived data or aggregate expression could be, for example the net sales booked, derived by subtracting commissions, returns, recoveries, and taxes from the gross sales.

The business intelligence block module 140 contain input and output parameters. The business intelligence block module 140 comprises external keys, link identifications, pointers to connect to, comment threads, issue escalation, action items tracking, milestones specific to the metrics catalog definition module 132. Under the business logic module 130, the user 220 can drill down from the aggregated data to get the components that make up the aggregated data. Through the collaboration module 142, the user 220 can collaborate with others by attaching link ids or pointers to collaborative acts such as comment threads, issue escalation systems, action item tracking, milestone status tracking and root cause analysis processes, connected to the Business intelligence blocks.

AI/ML Algorithm Library 134 serves as the index, or table of contents or the reference card for all the AI/ML algorithms and neural networks etc., In the AI/ML Algorithm Library 134, the ways of calling every algorithm, its input and out parameter names are all documented. So, when the users 200 or 220 need a specific AI/ML algorithm to be run, they can select any algorithm of their choice and they supply the input parameters needed from the one graphical user interface 150. AI/ML algorithms are pre-coded and store in the AI/ML Algorithm Library 134. All of the AI/ML algorithms have the same structure for parameter passing. In a preferred embodiment, this standardized parameter-passing can be achieved by a standardized input/output notation similar to the Industry Standard Abstract Standard Notation 0.1 (ASN.1) Another embodiment can employ the same standardization via protocols similar to ANSI X.12 standard.

Training set repository 136 houses a list of training sets, required for each one of the AI/ML algorithms stored in AI/ML Algorithm Library 134. This module is kept on its own for two reasons. One, not all AI/ML algorithms require training sets, only supervised learning AI/ML algorithms do. Second, the training set repository 136 allows users 500 and/or 220 to operate directly with the training set in an offline setting via the graphical user interface 150 to enhance and make the training set repository 136 richer. In the offline setting, user can manually enter more exceptional conditions for the AI/ML algorithm An example of the embodiment of the training set repository involves a missile detection system. Incoming missile signals would be shown to the operator, along with the possible detections: this missile has 67% chance it is from enemy source 02, 82% chance it is from enemy source 03 etc., However, the operator, in days prior to AI/ML, would choose source 02, even though it shows lower probability, based the operator's subject matter expertise. With the advent of AI/ML algorithm that learns the operator's subjective matter expertise, the predictions would be stored to the training set repository 136 for future prediction. Initially, the system may not predict the best outcome, it is still in the process of learning. But in the new world, the user 200 can still make the training set much more intelligent, by playing "what-if" scenarios using the one graphical user interface 150 and enhance the training datasets.

Referring to FIGS. 1 and 2a, a hypothetical example 101 of the plurality of structured data 12 is illustrated, where a structured data contains sales data from different regions (continents) for different products, such as cellphones of iPhone® and Samsung®, and the sale dates with the commissions (product sale layout). Referring to FIG. 2b, a hypothetical example 103 of the plurality of structured data 12 contains information about the products in the warehouse (product warehouse layout), their shelf life and the overhead cost. Those two structured data, the sales data and warehouse data, may be transferred into the composite data master file (CDMF) 430 within the database 20 through the network 30 and the ETL module 110 (in FIGS. 1a and 1b).

Referring to FIG. 1a and FIG. 2c, a hypothetical example 105 of a plurality of unstructured data 14 contains twitter opinion feeds received from a website that collects user opinion on auto insurance company MyAutoCo. Two customers comment differently in an unstructured format in the column titled comment 18. The column name keywords is coming from a separate Training Data, external to the feed. The "sentiment keywords" 106 is NOT coming via the feed, instead it is the pattern that the AI/ML algorithm looks for, in order to come up with the last column which says "Likely to buy" as a percentage likelihood that the user will buy the insurance, based on the comments given by the user, as compared with the reference keywords, that came from the Training data. The unstructured data may be transferred into the composite data master file (CDMF) 430 within the database 20 through the network 30 and the ETL module 110 (in FIGS. 1a and 1b).

Referring to FIG. 1a and FIG. 2d illustrates two hypothetical examples 107 of the plurality of IoT signal data 16 containing patient data collected in a hospital floor from patient beds. For each of the two patients, the thermometer sensor id, sensor type is collected, to distinguish between what sensor the data is coming from. In this case both data are collected from RTD thermometers. Next two columns are the ideal set point that the temperature should be at, versus the actual temperature at that time of reading. Also given to the left are four additional columns that are typical administrative components of any messaging software. Take for example, IBM MQ series, or Apache Kafka, where every streaming message packet will contain message Id 108, message timestamp, message partition (for redundancy) and message offset as the packets arrive. The signal data may be transferred into the composite data master file (CDMF) 430 within the database 20 through the network 30 and the ETL module 110 (in FIG. 1a).

FIG. 3 serves as an example of Layout Definition table 410. It shows four layout definitions: INPUT-S01 Sales Data, INPUT-S02 Warehouse data (both are examples of structured data) and INPUT-U01 (Twitter Feed unstructured) and INPUT-IoT-01 (Patient temperature as IoT signal). In FIG. 3, left-most column gives the actual structure of Layout Definition table 410. The next four columns referred to the INPUT layouts mentioned above. Next comes FIG. 4a, FIG. 4b and FIG. 4c, which explain the Layout Details Table 420. In FIG. 4a, FIG. 4b and FIG. 4c, the top header is the actual structure of Layout details table 420. FIGS. 2a, 2b, 2c, 2d each contain the headers and actual data coming in from each of those four INPUT sources.

Referring to FIG. 3, in one embodiment, the columns in the layout definition table 410 are as follows: "LAYOUT ID," a sequence number to refer to the Layout; "LAYOUT NAME," the name of the layout, for example, "WEEKLY SALES"; "MDTYPE," a column defining the Master Data Space; "HOW OFTEN," the frequency of updates to the plurality of composite data, for example, monthly, weekly, daily, intra-day, or hourly or streaming text or streaming IoT signal; "INPUT MODE," an indication of whether the data is going to be loaded via CSV manual upload, or automatic; "SCRIPT NAME," an indication of the loader script that will be called which will load the data automatically; "SOURCE SYSTEM," an indication of ftp or server DNS name or the message pipe id; "THE PLURALITY OF COMPOSITE DATA OWNER," person's name email, phone etc. of the person in charge of the generation of the plurality of composite data; "SYSTEM OWNER," person's name email, phone etc.; "SUPPORT OWNER," person's name email, phone etc.; "PRE-SCRIPT NAME," an indication of the program or ETL function call to be executed prior to data loading, such as special data cleanup and notifications; "POST-SCRIPT NAME," an indication of the program or ETL function call to be executed after data loading, such as special data cleanup and notifications; "NOTIFY EMAIL," an indication of the email to notify a person in case of data upload errors.

Referring to FIGS. 4a, 4b, and 4c, each giving an example of the layout details table 420. The top row (header) contains the information about every column in every layout. Referring to FIGS. 4a, 4b, and 4c, the layout details table 420 shows the information about all the plurality of stored data 22 (FIGS. 5a and 5b) in the database 20 by the ETL module 110 from the plurality of composite data sources 10 comprising the plurality of structured data 12, the plurality of unstructured data 14, and the plurality of IoT signal data 16 as the example illustrated in FIG. 2a, FIG. 2b, FIG. 2c and FIG. 2d, respectively. Referring to FIGS. 4a, 4b, and 4c, an example of the columns in layout details table 420 are as the follows: "LAYOUT ID," the foreign key from the Layout Definition table 410 (in FIG. 3); any internal sequence number (not shown) that defines a detail record; "COLUMN," header name of the columns in the plurality of composite data source file, such as store location, product, sales serial number etc., which is the friendly name given in the headers of column A or B or C as appropriate; "COLUMN TYPE," an indication of whether the column is either SEQUENCE, ATTRIBUTE, THE PLURALITY OF COMPOSITE DATA, THE PLURALITY OF COMPOSITE DATA BLOB, DERIVED DATA, AGGREGATE EXPRESSION, FYI BIG, FYI SMALL, FYI BLOB(comment fields of different types), RECORD KEY etc.; The term BLOB refers to "Binary Large Object"—which is the way to store all signals, IoT, and any non-textual information such as images, PDF etc.; "DATA TYPE," indicating if this is money column String, or number and how is to be formatted, applicable only if the COL TYPE above is either THE PLURALITY OF COMPOSITE DATA, DERIVED DATA or AGGREGATE EXPRESSION; "VALIDSCRIPT," storage of the script for ETL formula expression if THE PLURALITY OF COMPOSITE DATA or DERIVED DATA or AGGREGATE EXPRESSION exists; "Internal mapped column in CDMF," an illustrative embodiment assignment of the designated columns in CDMF in accordance with columns in the plurality of composite data source, which is a mapping of friendly name given in column name to the internal storage in CDMF; "CDMF FILE:" a reservation for recording multiple networked CDMF files in case of large databases; "user entered Formula" aggregation or data manipulation formula in friendly notation, as well as any AI/ML algorithm picked from the AI/ML library for execution, which would convert the user friendly formula into "Converted CDMF internal columns; "COL UPDATE TEMPLATE SQL," storage of the actual UPDATE statement template, such as like this:
UPDATE CDMF O
SET $TargetField$=(
SELECT TRUNC ($COLFORMULA$,
FROM $LIST_OF_TABS$
WHERE 1=1 $LIST_OF_ANDS$)
) WHERE FILENAME='$FILENAME$'

Referring to FIGS. 4a, 4b, and 4c, the tags enclosed between $ signs, $TARGETFIELD$ representing the target CDMF column that needs to be updated, $COLFORMULA$ indicating the value from COLFORMULA column above which as the SQL expression that calculates the commission, $LIST_OF_TABS$ representing the dynamic views that are created, that give the impression that it is a relational data model. But, note that all of the dynamic views actually map back to the system of networked files one or more CDMF 430 files; this UPDATE statement making the dynamic computation in real time, across all data sources; $LIST_OF_ANDS$ computing based on RECORD KEY name match and that creates the dynamic join, which the user would otherwise have to create manually for every update; the tag $targetField$ would be replaced by datval04, which may represent, for example, the commission field, assuming product sale layout are uploaded; In that case, the tag COLFORUMAL would be replaced by datval02*0.03 for 3% commission; the tag $LIST_OF_TABS$ would be INPUT-S01 which represents the view name that logically looks only at the records of this PRODUCT SALES layout for selective update. The tag $FILENAME$ represents the new data that came in the month of July. Sales01.xls. Only those rows in the product sale layout that correspond to July month would be updated; and "KPI_YN," indicating, from a business perspective, if this is a Key Performance Indicator or not Yes or No.

As shown in FIG. 4a 4b, 4c, under header column titled "User entered ETL formula", the Graphical User Interface-emodule 150 allows user to define their ETL commands for INPUT-S01, such as (DE29/(DE27−DE28))*100 to calculate the COMMISSION PERCENT. Here the calculation refers to the sum of commission paid which is given in column G of the source file INPUT-S01, divided by the difference between column E and column F—which is the net sales.

Referring to FIGS. 5a and 5b, an embodiment of the CMDF comprising denormalized data from four composite data sources that contain the plurality of structured data 12, unstructured data 14, and the plurality of IoT signal data 16, and their respective data shown in FIG. 2a, FIG. 2b, FIG. 2c and FIG. 2d respectively. It is to be noted that, regardless of the layouts of all incoming composite data, they all fit into the denormalized data structure, which yields itself as a relational table for SQL (Structured Query Language) manipulation, as well as a distributed data repository for receiving unstructured data, signals and IoT information.

The denormalized table CDMF 430, fully retains the originality of the data that came from the plurality of composite data sources 10.

The benefits of such denormalized composite data master file holding entire the plurality of composite data include, but not limited to: (1) the user need not construct a logical relational database for each use; (2) the user can simply import the plurality of composite data in different layout formats, from different sources; (3) the user need not consider referential integrity and constraints and avoid any programming in that regard; (4) it constructs a single, unified data structure that is applicable to various business scenarios; (5) the user need not prepare user's own database schema, with huge programming efforts; (6) the user need not write conventional ETL code on every custom database schema situation, to specify formulas, aggregation and cleanup; (7) this arrangement also provides the mechanism for calling and executing AI/ML algorithms from the AI/ML algorithm Library 134, and treating the AI/ML algorithms as a black box without having to worry about the internal workings of AI/ML algorithms, 8) the entire data governance is done by end users without programing using query languages since there is no need to explicitly join data scattered in different tables; (9) entire alert mechanism to different owners is done via a single CDMF 430; (10) it also allows easy data validation, OUTLIERS, REJECTS processing etc., directly by the user without programming 11) finally, the same CDMF structure in memory is also used for sending control signals back to the controlling devices in a situation that employees IoT signals, and it is achieved by the IoT Control Signal module 138 which communicates to the CDMF 430. The phrase "without programming" or "does not need programming" means that no software code needs to be written to achieve the required operation or alternatively no software developer needs to be hired to write software code to cleanup data, to construct database, to compute metrics, to write AI/ML algorithms, to create charts, or to write code to do collaboration.

As shown on FIGS. 5a and 5b, the CDMF 430 has predefined column headers, (given in the first row of FIGS. 5a and 5b). The significant columns in CDMF are, but not limited to: as (1) "ISN" or "sequence number," a unique number that identifies this record; "MDATE" aka. Measurement Timestamp, the time that this record corresponds to, for example, if the record is a sales summary record for the month of July 2015, the measurement timestamp would be July 2015; it is also the time that this record was successfully loaded into CDMF; "Source," this field is for recording where the data came from. It could be from an excel file, or it could be from a csv file, or via ftp or via WEB services feed, for example, it could be sap080216.xls an excel file created by SAP system, or coming from ftp://101.01.01.89 or it could be from a batch program BAT080216; or it could be coming from an Apache Kafka system which brings in IoT signals, piped in real-time. This tells the process device 40 where the data came from and loaded into the CDMF 430; "Source layout name," indicating the record layout of the incoming data set, for example if the user is loading Financial General ledger data, then it would have FINGEN_EUROPE_GL as the name where FINGEN_EUROPE_GL indicates that the financial General Ledger coming from Europe; if the user is getting a slightly different layout, from ASIA, which has fields different from EUROPE, then those records will be prefixed with the source layout name FINGEN_ASIA_GL. The user can also upload Supply Chain invoice data, and it will be loaded into the same CDMF 430 and those records will be marked with SC_EUROPE_INV layout. It is assumed that the user has already predefined the Layout Definition table 410 and Layout Details table 420 templates, for every incoming file template; "Source Layout Type," indicating whether it is a transaction data, product Master table etc., or other streaming data file.

The second group of columns in the CDMF 430 is "ACCESS RULES," to store information like: "DATA OWNER/SPONSOR" the contact for the supply of data, and data errors in loading the CDMF 430. It could be the employee id, email and phone number of the person. "BUSINESS OWNER/SPONSOR," could be the employee id, email and phone number of the person. "SUPPORT CONTACTS," could be the employee id, email and phone number of the person. "CRUD," acronym for create, retrieve update, delete flags.

The third group of columns in the CDMF 430 is "OUTLIERS/REJECTS FIELDS," including columns like: "OUTLIER FLAG," an indicator of Yes/No. Based on the ETL commands specified by the user during loading, if the record was in fact flagged as an outlier. For example, the user may not want to load records that involve sales less than 2 dollars. However, the user may want to keep the record just to indicate how many sales transactions happened; "OUTLIER REASON," a short explanation for why the record was flagged as an outlier. "REJECT FLAG," an indicator of Yes/No. In some cases, the user may want to reject the record if it has a blank. Or, the user may want to reject a record if it has an invalid country code. "REJECT REASON," a short explanation for why the record was flagged as a REJECT.

In the case of unstructured data coming in the form of signals, there is a special treatment required. When a system is receiving signals from a missile, or torpedo or even an IoT device in a harsh environment amidst "signal noise" (signal noise is a term used to smooth out incoming signals by the interpolation, where any missing signal points due to noise are artificially created to ensure smoothness). Such records inserted into CDMF in the case of IoT or signals are marked as "SMOOTHED". So the user 200 has a record of the real signals received, as well as the filler records that are inserted to ensure signal smoothness.

The third group is ATTRIBUTE FIELDS: "ATTRIBUTE CODE," indicator for the "dimension" (dimension is the term used in data warehousing) or the qualifier that the data pertains to. For example, if the user is inputting sales figures for Paris, the word Paris would go here. If the user is giving sales figures for iPhone 7 Plus, then the product iPhone Plus would go here. "ATTRIBUTE PARENT," an indicator of the hierarchy of the code. For example, in case the city code was Paris, then the word "France" would be entered here as the parent country. If the user has entered iPhone 7 plus in ATTRIBUTE CODE, then "APPLE" would be entered here as a parent. "ATTRIBUTE CATEGORY," an indicator of the CATEGORY that it belongs to. For example, the word "GEOGRAPHIC REGION" would be entered here as a category, if France and Paris were entered in the above two fields. The word "MOBILE DEVICES" would be entered here if the above two fields contained APPLE and iPhone 7 Plus. "THE PLURALITY OF COMPOSITE DATA FIELDS, "This is a placeholder for the plurality of composite data. For example, if the plurality of composite data was a sales figure $29,000, this would contain 29000 as an unformatted number. Other examples might be: the number of returned merchandise, or a time value when a patient was admitted into ER, or the temperature of a furnace, or a Boolean value true or false etc. Or, it could be a BLOB in the case of unstructured data such as signals and IoT.

It is important to note that the signals and IoT can be stored as image files, video streams, RF (Radio Frequency) signals etc., in individual files, and in CDMF you can just have a pointer or reference to a filename that merely points to the location where the actual unstructured file is stored.

In CDMF 430, the columns are represented as datval01, datval02 etc. which are "placeholder sets" to store data from every composite data source, into the same CDMF file 430.

Depending on the size of the implementation, the number of placeholders might be 20, 50, 100 or 500 and so on. The number of placeholders depends upon the user's 500 judgement based on business need, of how many attribute dimensions to pre-allocate, how many the plurality of composite data placeholders to pre-allocate etc.

Another group of columns in CDMF 430 is the DERIVED DATA FIELDS. DERIVED DATA FIELDS are also named same as datval06, datval09 etc., and they are given physical storage allocation in the CDMF 430. With one difference. They are NOT coming from the source file, instead they are calculated or derived based on ETL compute rules specified by the user 200 in the Layout definition table 410 under "COLUMN FORMULA". For example, the incoming sales record may have sales figure $29,000 as the sales. In the LAYOUT DETAIL DEFINITION, the user 200 may have entered a Commission field as a derived field and entered a 3% sales commission as the formula. In that case, upon data loading, the system will automatically compute and populate this datval09 field with the commission amount. In CDMF 430, it has created placeholder columns for DERIVED DATA as well. In these derived fields, the user 200 can give formulas or (extract, transform, and load) ETL commands without a need for a programming. The user can also call AI/ML algorithm as appropriate to execute, specifically upon receiving any data element. The user does not need any programming in order to call or operate AI/ML algorithm.

Another group of columns in CDMF 430 is COMMENTS FIELDS. These columns are placeholders for storing text and Binary Large Object Storage (BLOB) that can hold image jpeg files, or even links or pointers to web sites, jpg files, image files, video files, IoT signals etc.

Another group of columns in CDMF 430 is RECORD KEY, where unique identifier is the record carries. For example, it could be the Patient ID, or Account number or Service Ticket number. The columns, USER KEY001, USER KEY002 etc., are as placeholders for this purpose, for example, up to ten such keys per record. In traditional relational database management system, the primary key and the foreign keys are used to join tables. Here the method and the system has done generic, master de-normalization, where it has automatically joined data (not from different relational tables, but different rows from one CDMF master table) for the user, without a need for development. It is important to note that, once the user specifies more than one RECORD KEY, then they become concatenated keys, and will be used as such, without explicit programming.

Another group of columns in the CDMF 430 is RECORD LOCKS: these three columns are for locking: LOCKING USER, LOCK TIME, LOCK MODE (to update a single field or multiple fields, as a comma separated value string of columns).

The aggregate expressions are pseudo columns that in the memory when the system performing business metrics. It is important to note that there is no storage allocated in CDMF 430 for aggregate expressions. They are mentioned here only for the purpose of completeness. They are mentioned here since they can be accessed in the same way as The plurality of composite data and Derived Data in SQL expressions and in ETL commands. For example, if there is a situation that two sales transactions, of two different products, by two different salespersons, in two different outlets of the same Retail company and how does the system work to compute the commissions. Since the CDMF stores the data in appropriate attribute columns, in which same column for sales no matter what source system it came from, the user can simply write out an "aggregate expression" that instruct the system to calculate "sum(commission)/sum(s) %" and the system internally issues a "dynamic SQL" query the appropriate columns in SELECT, attaches the appropriate WHERE conditions, and also summarizes the calculations by any product, region, store, salesperson etc., So, four major differentiating factors: 1. Aggregate expressions do not require programming, they can be specified by the user. 2. They do not need storage allocations in the CDMF, since all calculations are done on the fly. 3. The aggregate expression can be marked as a "Business Metric" and attach alerts/limits and Red/Yellow/Green conditions which will be displayed on the fly. 4. A user can do n-way drill down from them without prior programming.

FIG. 5c illustrates how aggregate expressions work 432. The individual line items show the commission percentages 1.07% and 1.45% respectively for iPhone and Samsung. To find the Average Commission Percentage, if one calculates the average of 1.07 and 1.45, one would get 1.26% which is incorrect. The Average Commission Percentage has to be computed from the sum of sales $47000 and the sum of commission paid $550, which results in 1.21% which is the correct calculation. This has to be dynamically computed every time a user wants to see the Average Commission Percentage by product, or region or both.

FIG. 6 illustrates a flowchart of a method 599 for receiving data from a plurality of composite data sources. This method transforms the received data according to the ETL rules specified by the user in Layout Definition Table 410 and Layout Details Table 420, and storing them into CDMF 430, all of which are housed in the database 20.

In act 510, providing, by a process device a graphical user interface for layout definition 480 (FIG. 7) and graphical user interface for layout details 490 (FIG. 8) which enable the user 200 to specify the format specification of the plurality of composite data in the plurality of composite data sources, on the at least one graphical user interface for layout definition 480 and another at least one graphical user interface for layout details 490. The user 200 (FIG. 1*a*) defines the format specification of the plurality of composite data sources in the layout definition table 410 (FIG. 4), which comprises the layout identification for the plurality of composite data source, the name of the data source, the update periodicity, the plurality of composite data owner, the data system producing the plurality of composite data source, and the file name of the plurality of composite data source, or as applicable, it could be a streaming data or streaming signal source via "topics" through the "partitions" and "offsets" coming from any typical messaging source in real-time. The user 200 also defines the corresponding columns of the plurality of composite data into the Layout details table 420 (FIG. 3), such as the order of column in the plurality of composite data source, the friendly name of the column in the plurality of composite data source, the column types of the plurality of composite data. At the act 510, the process device 40 (FIG. 1*a*) identifies the appropriate internal mapped columns in the CDMF and records them into the layout details table 420 (FIG. 4*a*). At act 510, the user 200 identifies the column type of the plurality of composite data: if it is an attribute, the plurality of composite data, comment column, record key, derived data or aggregate expression. Based on the column type, and ETL set of commands as given in "COLUMN FORMULA" column, act 520 performs ETL actions as appropriate. It could be a simple formula in the case of metrics catalog definition module 132 or the call to an AI/ML algorithm library 134 for execution. As another example, if a column is defined as "parent attribute" and the one next to it is a "child attribute", then it allows the ETL parser to treat the combination of a tree of hierarchical "parent-child relationships". In one source record, an attribute combination might be "Europe" continent, followed by "France" a country within Europe. In another source data record, the same attribute combination might say country "France" followed by its city "Paris". The parser then knows to "treat" them as "parent-child relationship" and issues the automatic "tree-structured SQL" query, without the need for programming. This is possible since the format of the Structured Query Language (SQL) is known ahead of time via the Internal CDMF mapping columns, the act 520 needs to just receive the value "Europe" and it will automatically trace down the tree and get all appropriate Sales numbers for every child and grandchild and so on. This is accomplished without the need for programming by the end user.

At the act 520, receiving, by a process device, the format specification of the plurality of composite data 5 in the plurality of composite data sources 10, wherein the format of specification comprises a plurality of instructions for an extract, transform, and load (ETL) operation, the format specification of the plurality of composite data 5 in the plurality of composite data sources, the upload parser in the ETL operations receives those instructions stored in the act 510 and process the data in accordance with the format specification stored in the Layout Details Table 420 as shown in FIG. 3.

At the same act 520, the user defines, but not to program or to write coding, the format specifications, which will solve the current issues existing in the relational database management systems that the format specification needs to be done by professional programmer. The complexity of the normalized data tables and the need to design custom database schemas are eliminated by the CDMF 430 which acts as a universal, pre-built database schema.

At the same act 520, the user defines, but not to program or to write coding, the format specifications for AI/ML algorithms, which will solve the advanced analytics issues that would otherwise need to be done by professional programmers or data scientists using languages such as Python or R etc., This is achieved, since, the AI/ML algorithm module 134 are written and kept ready to be called by user 200, already pointing to an universal database as the CDMF 430, according to AI/ML rules given in Layout Definition Table 410.

At the same act 520, the user 200 defines, but not to program or to write coding, the format specifications of any Training Sets that may be required if the selected AI/ML algorithm needs to function using the intelligence or the Training Set given in the training set repository 136. This is achieved by housing the Training Sets indexed and paired against its corresponding AI/ML algorithms defined in the AI/ML algorithm Library 134.

At the same act 520, the user defines, but not to program or to write coding, the format specifications for any optional control signals that may need to be sent out, in the case of streaming signals and IoT application. This is achieved by sending the output of IoT algorithms {such as PID algorithms—(Proportional, Integrative and Derivative) for sensor instrumentation, or FFT Fast Fourier Transforms and Butterfly algorithms for DSP digital signal processing.

For further discussions, it is to be noted that the composite data not only has files as source input, but also signals and information coming from IoT and other similar devices emitting signal data. Therefore, the term source "file" would interchangeably refer to a physical file or a message stream.

At the act 520, prior to reading the plurality of composite data source file, ETL operation performs, the "feed level" ETL functions that the user has defined such as rejecting files, sorting columns in files containing the plurality of composite data sources, alerting a designated person for errors in the files, or alerting a designated person for limit conditions set by the user.

At the act 530, receiving, by the process device, a plurality of instruction in the ETL operation, wherein the plurality of instruction may reject an abnormality in the plurality of composite data and alert a user for the abnormality in the plurality of composite data, the, the plurality of instructions, or ETL commands, might be the rules to reject the entire record, if the plurality of composite data was null or blank. For example, the Region field, instead of saying Europe or Asia, may simply be empty, due to data input error at the source. In such a case, either a default value of "USA" could be placed in the empty slot and an alert could be sent to the data owner or, the entire record could be marked as rejected. Thus, one function of ETL might be to detect abnormality in the plurality of composite data and alert a user for the abnormality in the plurality of composite data and take corrective action. Another example might be to do a calculation of Commission Amount from another column multiplied by commission % allowed, which is given in yet another column. To further add, when signals arrive or messages arrive, there may be missing signals due to noise as described earlier, which may involve signal smoothing and correction which is performed by act 530 as well.

At the act 540, receiving the plurality of composite data to be interpreted as an input from the plurality of composite data sources, the process devices 40 receive data from the plurality of composite data sources 10—either in real time as streaming data or as a batch file.

At the act 550, executing, by the process device, the ETL operation, wherein the ETL operation further comprises an extract process comprising selecting from the plurality of composite data 5, one or more transformation processes to aggregate and formulate the plurality of composite data 5, and a load process comprising loading the plurality of composite data 5 into a composite data master file by an order of the at least one row of the plurality of composite data sources in accordance with the format specification of the plurality of composite data 5; the ETL operation reads the plurality of composite data 5 from the plurality of composite data sources file contents, row after row, then the ETL operation reads the format of specification from the Layout Definition Table 410 (FIG. 3) that describes the template of the plurality of composite data source files. Subsequently, the ETL operation also uses the LAYOUT ID as the foreign key and reads the appropriate details from the Layout Details table 420 (FIGS. 4*a*, 4*b*, 4*c*, and 4*d*) that describes every cell of the row, and the corresponding mapping column in CDMF 430 (FIGS. 5*a* and 5*b*) that it needs to write the data into.

At the act 560, processing the plurality of composite data and storing the plurality of composite data into a plurality of stored data in the composite data master file CDMF by mapping the plurality of composite data 5, and a plurality of attribute associated with the plurality of composite data 5 into a prebuilt data dictionary structure, the ETL operation performs cell level ETL functions that the user has defined, by reading and computing the plurality of composite data in accordance with the derived data formula designated by the user in the Layout details table, and then writes into the corresponding mapping columns in the appropriate target row in appropriate columns in CDMF. Finally, act 560 will also do file level ETL functions on the CDMF that the user has defined after loading the plurality of composite data into the CDMF. In situations where 560 is receiving streaming messages or signals including IoT—any post processing outside the window of data collection will be done.

Also, in the same situation of processing streaming data, the messaging packet contains extra four columns (explained above) that get stored as well, so they will also be captured as FYI or any business purposes. (FIG. 2*c*).

In one of the embodiments, the method 599 also involves source data rollback, source data timing validation and layout dependency checking to eliminate cyclic redundancies among layouts.

Figure 9:
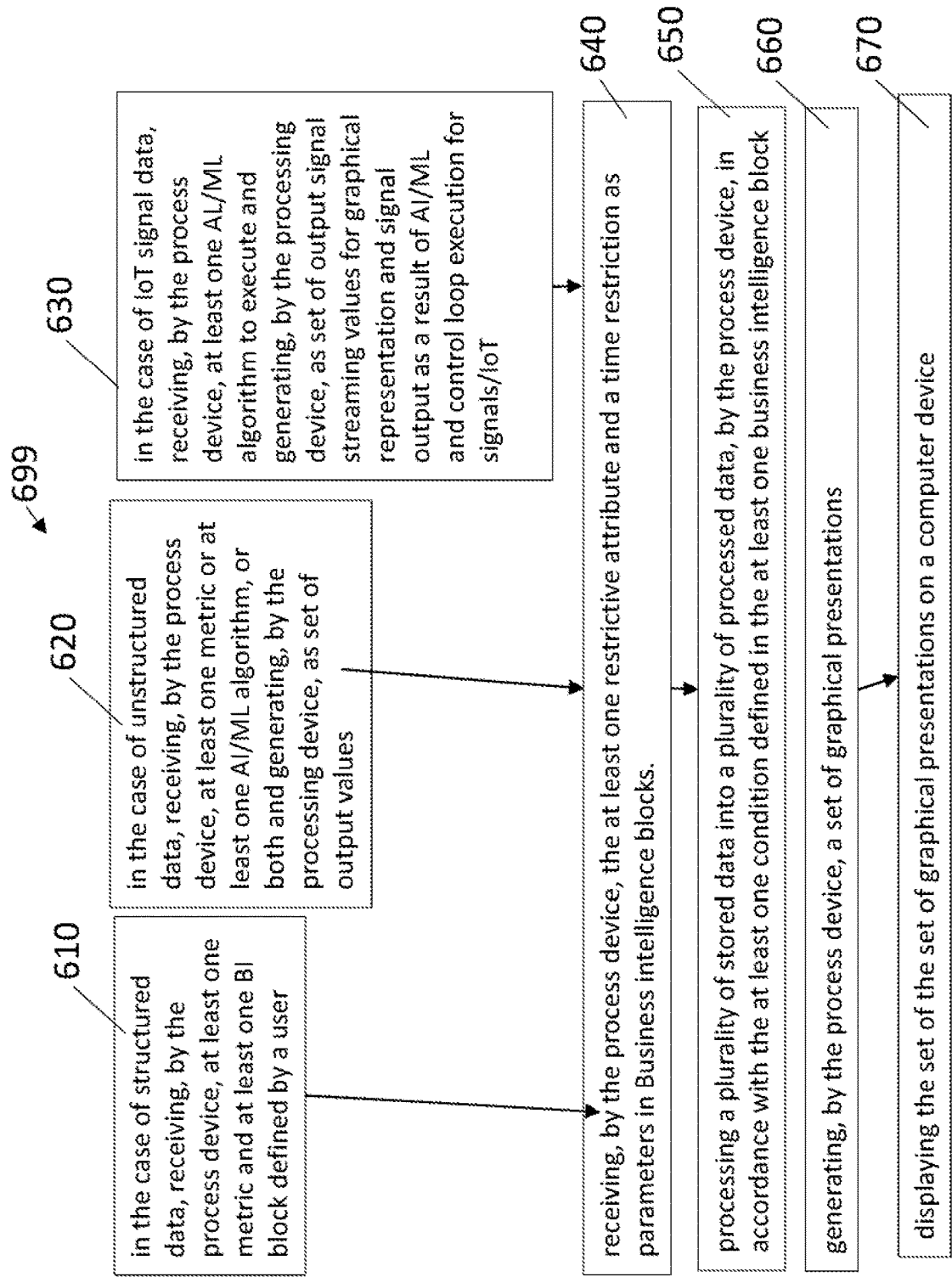
FIG. 9 is a flow chart diagram of a method for the defining and operating metrics catalog and business intelligence blocks in accordance with an aspect of the present invention.

FIG. 9 illustrates a flowchart of a method 699 for achieving three things: visualizing an operational metric, or visualizing and making use of the output of AI/ML algorithm calculations, or visualizing and making use of control signals generated by IoT processing, all three cases related to business performance. The method 699 further comprises the act to provide presentation of the data stored in the composite data master file CDMF for tracking the metric related to activity performance.

At act 610, in the case of structured data, at least one metric defined by a user through at least one graphical user interface 580 (FIG. 10a) without programming to query the plurality of stored data. Through metrics catalog, the user has defined the values for the process device to query and retrieve the plurality of stored data now residing in the composite data master file. The metric may fall into one of two kinds in terms of the CDMF. It could simply query a plurality of attributes from the plurality of composite data, for example daily sales, revenue etc., to be summarized over week, month, quarter etc., and sliced and diced by store, product, region etc., which are the attributes. The metric can also be derived data, or an aggregate expression. For example, the net sales booked, which is a formula that involves the calculation of sales minus commissions, minus returns, minus recoveries, minus taxes.

At act 620, in the case of unstructured data, receiving, by the process device, at least one metric or at least one AI/ML algorithm, or both, defined by a user through the at least one graphical user interface 585 (FIG. 10b) without programming. Thus, through AI/ML algorithm library, the user defines the values for the process device to execute the AI/ML algorithm and generate an output to retrieve a plurality of stored data in the composite data master file. The output from AI/ML algorithm could also be input to the at least one metric, (see example "Likely to Buy" based on AI/ML classification and sentiment algorithm execution in the case of MyAutoCo data given in FIG. 2c).

At act 630, in the case of IoT signal data, receiving, by the process device, at least one AL/ML algorithm to execute and at least one business intelligence block defined by a user without programming through a graphical user interface. wherein an output from the at least one AI/ML algorithm is optionally further to be received by a IoT control signal module 138 to control a device in accordance with a plurality of service level agreements predefined by the user. Thus, through AI/ML algorithm execution, which comprises algorithms to process IoT signals, the user defines the values for the process device to generate and retrieve the data now residing in the CDMF composite data master file. The output from AI/ML algorithm could also lead to a metric. For example, the IoT execution may send an alarm in case the reading and the setpoint never show the tendency to converge or if the reading shows values above limits.

At act 640, receiving, by the process device, at least one restrictive attribute and a restrictive time period as parameters in Business intelligence blocks for a "where" clause in a dynamic Structured Query Language (SQL) statement that are not seen by the user. By the "where" clause in the SQL statement, the process device retrieves, aggregates, and/or converts the plurality of composite data into a limited ranges or conditions, such the range of time, the type of data, the category of data. An example of the dynamic SQL statement is as:SELECT DECODE (getRDDataType ('$internal_colum$'), '99.99%', ROUND (NVL (AVG ($internal_colum$), 0), 2), '99%', ROUND (NVL (AVG ($internal_colum$), 0), 2), ROUND (NVL (SUM ($internal_colum$), 0), 2))
FROM CDMF WHERE 1=1
AND metdate>='$Var_From_Date$' AND metdate<='$Var_To_Date$'
AND spattrcat23='$Attribute_category$'
AND spattparent23='$Attribute_parent$'
AND spattrcode23='$Attribute_code$'
AND OUTLIERFLAG='N'

In one of the embodiments of the current invention, the Business intelligence blocks could fall into two categories: 1. In the case of pure, structured data, producing operational metrics, by using different parameter settings, including but not limited to: the plurality of composite data, derived data or aggregate expression formula, restricted to time period of data (from date—to date or the rolling view of three months, six months a year etc.) and a combination of attributes and 2. In the case of unstructured/and streaming IoT signals, create the AI/ML or pertinent algorithm execution output as yet another metric. (for example, the "Likely to buy" metric, which is a result of AI/ML execution). Finally, the user can configure and change the chart type and cosmetics of the chart. It is important to note these blocks are defined by the user not by the developers, in both cases mentioned above. The process device retrieves a plurality of stored data from the composite data master file CDMF, or a plurality of streaming data and signal IoT in real-time, by the process device, in accordance with at least one set of parameters in the at least one business intelligence block as defined by the user, the process device queries and retrieves a plurality of stored data from CDMF in accordance with metrics and business intelligence blocks defined by the user.

At the act 650, processing a plurality of stored data into a plurality of processed data, by the process device, in accordance with the at least one condition in the at least one business intelligence block defined by the user through the at least one graphical user interface, wherein the at least one condition to process the plurality of stored data comprising filtering, cutting out, combining the plurality of attributes of the plurality of stored data or plurality of streaming data or IoT signals in real-time, aggregating, computing, time period, and a combination thereof; the plurality of stored data or in memory, retrieved by process device in accordance with the Business intelligence blocks and the metrics catalog will be further computed or aggregated according to the predefined rules in the Business intelligence blocks and metrics. Such predefined rules could be, but not limited to, the metrics catalog limit set conditions, Red/Yellow/Green alerts for outliers.

In one of the embodiments, when the IoT signal data, a Master KPI metrics catalog definition process wherein the Red/Yellow/Green limits are called Service Level Agreements (SLAs) linked to Benchmarking, and the act 630 includes archival and retirement of metrics that are no longer in use. The user can save this entire building block for later reuse. In addition, these blocks could be arranged in a hierarchical fashion, or grid structures that the user can define on their own. The reuse could be, but not limited to: embedding them in dashboards or other relevant web sites and artifacts to measure business performance. The metrics and the Business intelligence block can be used in representations such as the Balanced Scorecard quadrants, which are, until now, performed as independent management initiatives aside from analytics. In one of the embodiments, a plurality of dashboard template can be created by the user comprising sections (aka Tabs) and subsections (aka Sub-tabs), dashboard access rules for deploying dashboards to different types of users.

At the act 660, generating, by the process device, a set of graphical presentations 170 (FIG. 1) of the plurality of processed data comprising charts, graphs, reports, and tables, and a combination thereof; the one embodiment of the Business intelligence blocks may be programmed to transfer the plurality of processed data in the act 650 further into XML/JSON strings, and passed on to external graphing software to build and pass back the graphical presentation for timeline trends, multi-attribute time series, pie charts, bar charts, metric list, area charts, image/plug-in, single metric fact, stacked bar charts, pivot chart, value based grid, time-value based grid, time-time based grid, plain comment, and even plain table lists of metrics etc.

Figure 11:
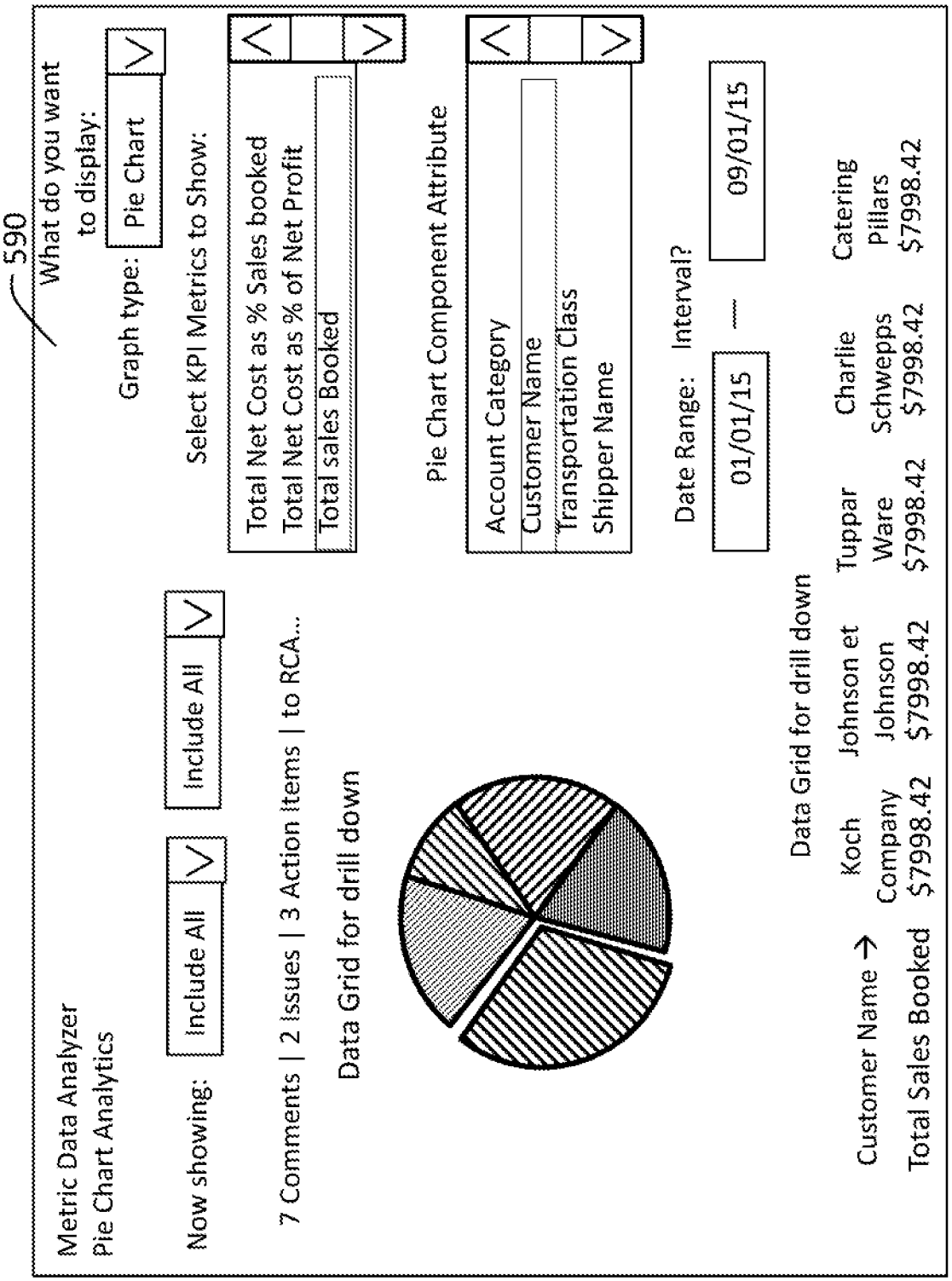
FIG. 11 illustrates an exemplary graphical user interface for defining and operating business intelligence blocks and in accordance with an aspect of the subject invention.
Figure 12:
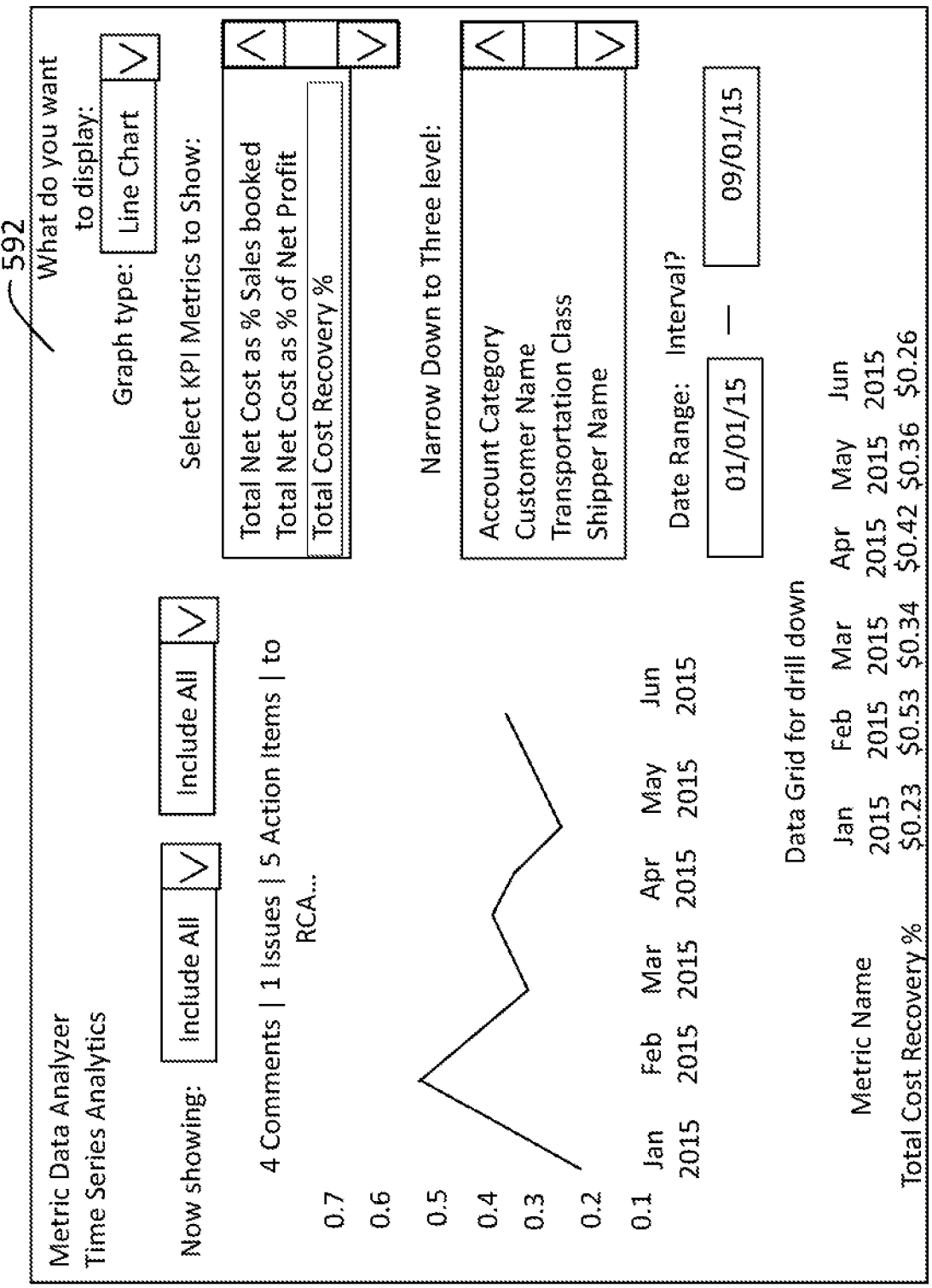
FIG. 12 illustrates another exemplary graphical user interface for defining and operating business intelligence blocks and in accordance with an aspect of the subject invention.

At act 670, displaying the set of graphical presentations (590 and 592) as shown on FIG. 11 and FIG. 12 on a computer device (210 or 220 in FIG. 1*a*

Figure 13:
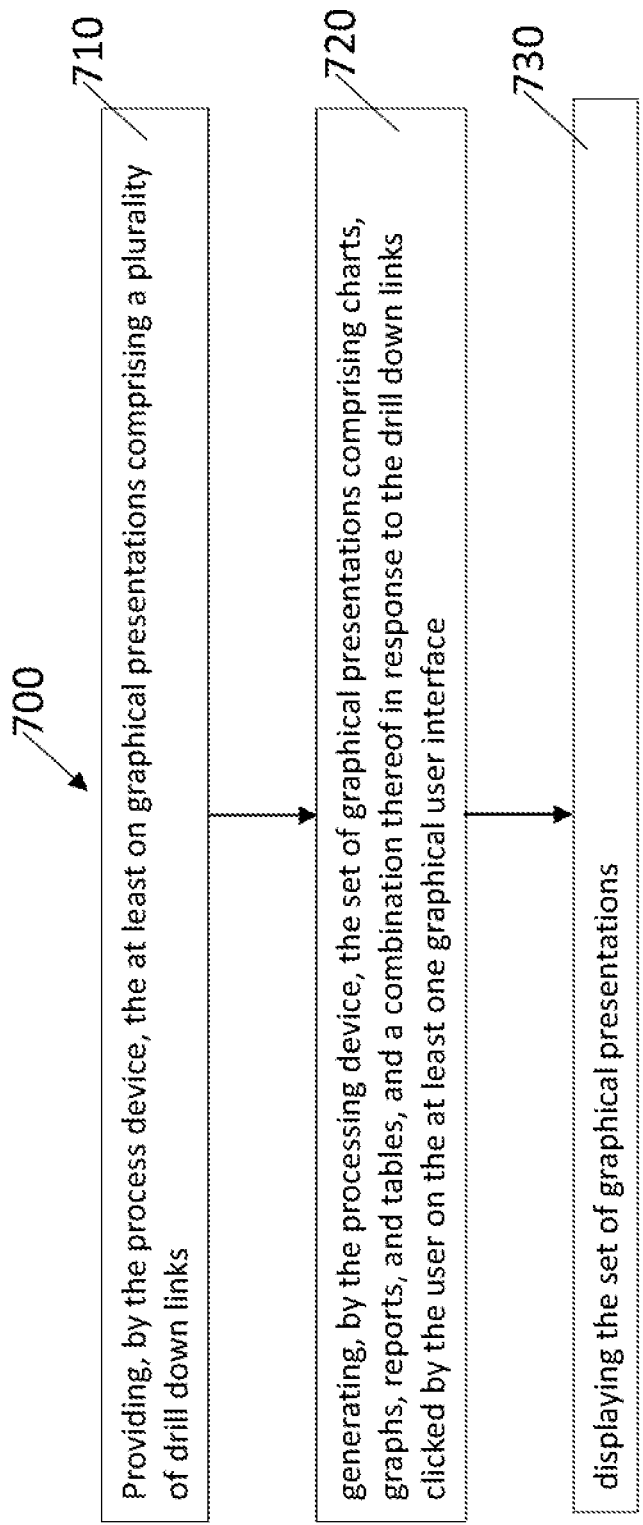
FIG. 13 is a flow chart diagram of a method for the operating of artificial intelligence and machine learning algorithm (AI/ML) module and business intelligence blocks in accordance with an aspect of the present invention.

FIG. 13 illustrates a flowchart of a method 700 for transforming and tracking activity performance which originated from a plurality of composite data sources 10 and now stored in composite data master file CDMF. The method 700 further comprises the acts to provide drill down of the data presented by the Business intelligence blocks in the group of methods 700.

At act 710, providing, by the process device, the graphical presentation comprising a plurality of drill down links, comprising A) time-based drill down, which can present the data from a one long time frame interval to shorter time frame, such as drilling down from a quarterly to monthly view; B) attribute-based drill down, where, from the data already presented in a higher category view, such as continents (Europe), to a lower subcategory data view, such as countries (France, Germany . . . ) in a specific continent; C) component-based drill down, which can provide a presentation from a high aggregated data level to detailed data level constituting the aggregated data, such as from a view of net sale down to a view of the components of gross sales, refunds, and discounts that constitute the net sale; and the view down to the actual data constituting the view presented by the Business intelligence blocks in the method 699 (as shown in FIG. 9). The business intelligence block module 140 (FIG. 1*b*) at the act 710 can be defined by the user 200 (FIG. 1) to retrieve processed data from the CDMF or processed and aggregated from the streaming data in real-time, beginning from aggregated data to its breakdown data constituting the aggregated data, which is called a drill down. If the breakdown data is also an aggregated data that are from a further breakdown data, the drill down can continue and go on iteratively. This iterative drill down can be defined to retrieve data until the user can get to the ultimate lowest granularity of raw data originally received from the plurality of composite data sources into the CDMF by the method 599 as shown on FIG. 6. For example, the sales data in a Business intelligence block is shown as an aggregated sales data for the sales in Asia and Europe. Then the aggregated sales data in Europe can be drilled down to show individual sales data in individual countries, such as France and Germany within Europe. If there is a plurality of composite data sources containing sales data from the sales in different cities, like Paris and Nice in France, then the drill down can continue down from France to show the individual sales data from the sales in Paris and in Nice.

In the case of streaming unstructured data coming in via the message pipe, for example data coming from a gas flow IoT sensor in an industrial thermal boiler, the data gets aggregated in real-time, to show the cumulative volume of gas that has been pumped in—the real-time BI plug in block continues to show the total gas thus far, and the user can at any point of time, drill down to get the graph of the gas flow timeline trend of what happened since the beginning of the day, or for the past one hour. The user can also drill down to see the components of the total gas flow calculation.

At the act 720, generating, by the processing device, a set of graphical presentations 170 (FIG. 1) of the plurality of processed data comprising charts, graphs, reports, and tables, and a combination thereof in response to the drill down links clicked by the user on the at least one graphical user interface. In one embodiment, the Business intelligence blocks may be programmed to transfer the retrieved data into XML/JSON strings, and passed on to external graphing software to build and pass back the graphical presentation for timeline trends, multi-attribute time series, pie charts, bar charts, metric list, area charts, image/plug-in, single metric fact, stacked bar charts, pivot chart, value based grid, time-value based grid, time-time based grid, plain comment, and even plain table lists of metrics etc.

At act 730, displaying the set of graphical presentations (590 and 592) as shown on FIG. 11 and FIG. 12 on a computer device (210 or 220) in FIG. 11 and FIG. 12. Bundled in the graphical presentation would be further links (such as URL links) to drill down further and the pointer placeholders to collaborative aspects (to connect this graphical presentation to comment threads, issues, action items etc.). Together, the graphical representation, the drill down links, and the placeholder links for future collaboration etc., all form a reusable building block. Examples of the graphical presentation of a pie chart are shown on FIG. 11 and a time trends in FIG. 12.

Also, at act 730, the user can save this entire building block for later reuse. The user can subscribe and embed the entire building block in their web sites (for example like RSS feeds) In addition, these blocks could be arranged in a hierarchical fashion, or grid structures the user can define. The reuse could be but not limited to: embedding them in dashboards or other relevant web sites and artifacts to measure business performance. The reuse could also be but not limited to: sending the result of AI/ML execution back to the Training Set, to enhance the richness of knowledge for use later in the case of AI/ML supervised learning algorithms. The metrics catalog and the building intelligent plug-in blocks can be used in representations such as the Balanced Scorecard quadrants, which are, until now, performed as independent management initiatives aside from analytics.

Figure 14:
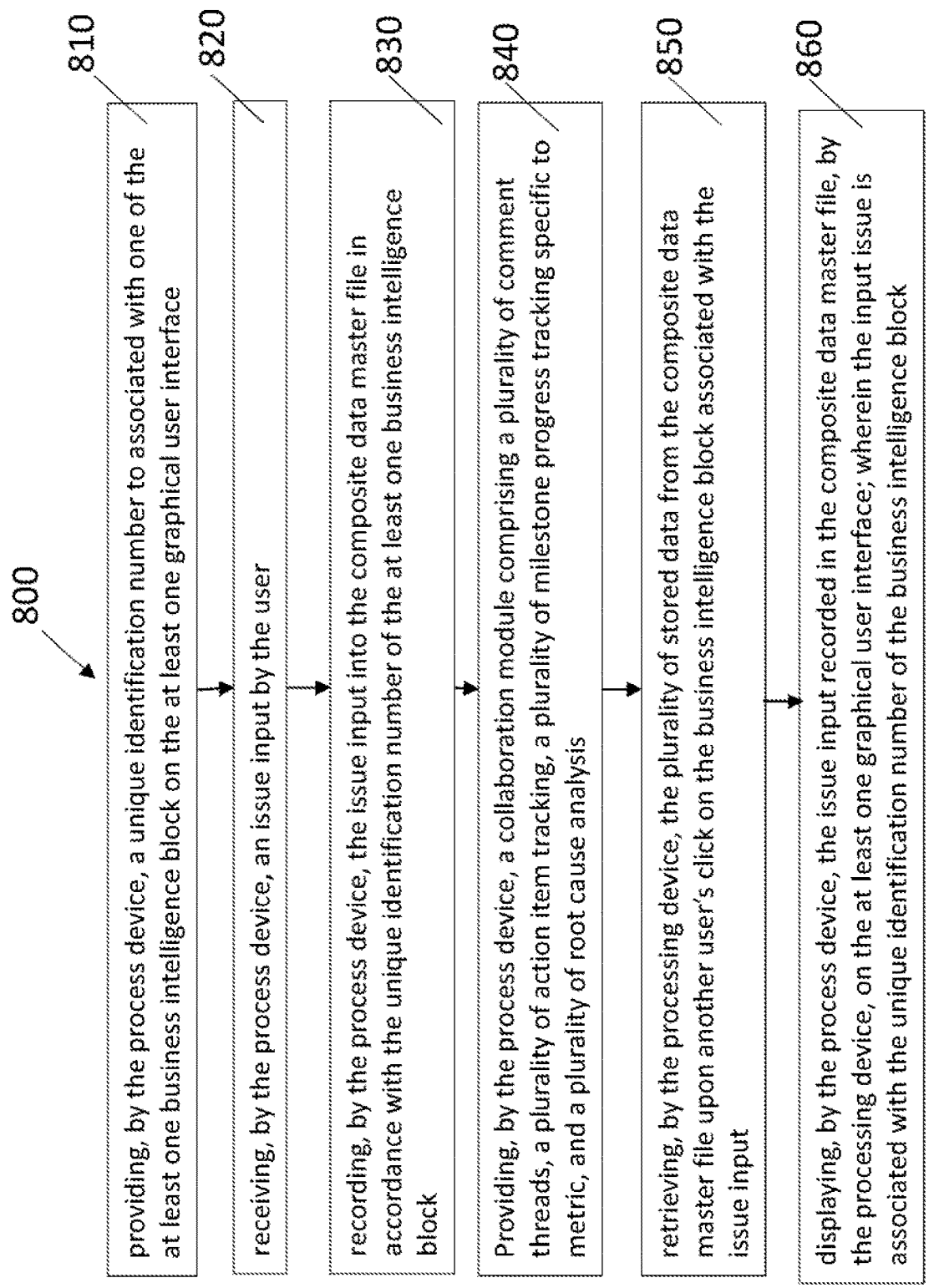
FIG. 14 is a flow chart diagram of a method for the operating of a graphical user interface and business intelligence blocks for display the output on the graphical interface in accordance with an aspect of the present invention.

Referring to FIG. 14 illustrating a flowchart of a method 800 for collaborating among business users, the users 200 and/or 220 (FIG. 1) are working through the collaboration module 142, upon the user visualizing metrics (or the result output coming from AI/ML algorithm execution) trends and charts information from composite data source(s) using methods 599 and 699, during the course of an analytics session.

At act 810, providing, by the process device, a unique identification number to associated with one of the at least one business intelligence block displayed on the at least one graphical user interface. "Block ID" is as a foreign key to associate with a business issue that the user would like to record, route and track. Such an issue tracking business process/system could be external to process device 40. The process device 40 suffices by supplying the ID intuitively upon clicking for example, the "issue" link and the process device helps seamless navigation for the user to go and manage the "Issue" associated with the "activity performance metrics" and collaborate with other business users and return to the Business intelligence block within process device 40, defined by the user 200.

At act 820, receiving, by the process device, an issue input by the user. The processing of the issue could be external or internal to the process device 40.

In one embodiment, at act 830, recording, by the processing device, the issue input into the composite data master file in accordance with the unique identification number of the business intelligence block. the process device records the issue the user input into the CDMF in accordance with the identification of the Business intelligence block. By this association and record, all the business issues associated with the metrics can be tracked with the specific block and the data associated with the Business intelligence block.

At act 840, providing, by the process device, a collaboration module comprising a plurality of comment threads, a plurality of action item tracking, a plurality of milestone progress tracking specific to metric, and a plurality of root cause analysis. The users can create other pertinent collaborative actions: such as but not limited to: comment threads, issue tracking, action item tracking, milestone progress tracking specific to every target metric, and root cause analysis—all tagged via the unique identification number of the Business intelligence block to the respective specific identifications of every issue, action item, comment thread, milestone etc., and be able to track them seamlessly, to give a full business intelligence experience and a business process to govern the business by metrics or the equivalent result output coming from the execution of the AI/ML algorithm.

At act 850, retrieving, by the processing device, the plurality of stored data from the composite data master file upon another user's click on the business intelligence block associated with the issue input. another user can view the recorded issues and tracking by clicking on the Business intelligence block that are associated with the issues and tracking.

In the case of real-time streaming data, where the graphical interface displays the business-intelligent blocks in real-time, as the streaming data or IoT signal arrives, and the processing device 40 computes the metrics or the results of AI/ML execution in real-time, the collaboration, decisions, sending control signals etc., can happen in real-time. For example, the missile or torpedo tracking systems can receive signals and interpret the results and movements of missiles in real-time, in trending charts and dashboards, and the users can collaborate, raise issues, throw action items and make decisions in real-time as well.

At act 860, displaying the issue input, by the processing device, on the at least one graphical user interface, those recorded issue and tracking can be displayed on a display, such as computer display. End Users can have comment threads built, all tagged to a specific block identification number and it will display all collaboration.

In another embodiment of method 800, the users can create and schedule period online meetings—every day, week or month. Prior to every meeting, the system would create Meeting Agenda with all escalated issues, open action items, and milestone progress. From the collaboration achieved under method 800, users can conduct meetings, address issues, action items, milestones one after the other and take notes, make decisions and throw new action items and resolve issues. At the end of the meeting, the text input into the process device can be stored into the CDMF for future use, in addition to being distributed as reports such as PDF reports or online meeting minutes.

In one of the embodiments, the methods 599, 699, 700 and 800 may be combined and reorganized into a logical sequence of acts towards metrics (or results of AI/ML execution) data collection, aggregation, reporting and decision-making. The sequence of acts are: collect, construct, publish, subscribe, analyze and decide.

It shall be noted that the business logic module 130 business logic module 130 comprising a metrics catalog definition module 132, an artificial intelligence and machine learning algorithm (AI/ML) library 134, a training set repository 136, a IoT Control Signal module 138, business intelligence block module 140, a collaboration module 142, the extract transform load module 110, can be operated on the at least one graphical user interface by an user without programming.

What claimed is:

1. A system for integrated performance measurement environment, comprising:
    a plurality of composite data from a plurality of composite data sources, wherein the plurality of composite data further comprises a plurality of structured data, a plurality of unstructured data, and a plurality of signal data;
    an extract transform load module in a memory of a process device, extracting, transforming,
    and loading the plurality of composite data from a plurality of composite data sources,
    wherein the extract transform load module further comprises
        a layout definition module storing one set of data layout definitions, wherein the one set of data layout definitions further comprises a set of format specifications defined by a user without programming for artificial intelligence and machine learning algorithms and for the plurality of composite data,
        a data reception module to receive the plurality of composite data from the plurality of composite data sources into the extract transform load module,
        a data unification module comparing the plurality of composite data with the one set of data layout definitions in the layout definition module,
        a data upload and correction module generating a plurality of rejected records and a plurality of rejection reasons where the plurality of composite data inconsistent with the one set of data layout,
        a real-time database writer module writing the plurality of composite data as a plurality of stored data into a database, and
        a real-time streaming monitor module monitoring a transmission of the plurality of composite data and providing an alert when the transmission is not in accordance with a predefined schedule;
    a database receiving the plurality of composite data from extract transform load module and
    storing the plurality of composite data as the plurality of stored data, wherein the database
    further comprises
        a layout details table, a layout definition table, and at least one composite data master file;
    a business logic module in the memory of the process device allowing a plurality of
    operations on the stored data, wherein the business logic module further comprises
        a metrics catalog definition module,
        an artificial intelligence and machine learning and algorithm library,
        a training set repository module, an Internet of Things Control Signal module,
a business intelligence block module, and
a collaboration module,
wherein the metrics catalog definition module further comprises a plurality of metrics catalogs,
wherein the business intelligence block module further comprises a plurality of business intelligence blocks,
wherein a plurality of service level agreements can be defined in the Internet of Things Control Signal module to set out a plurality of control signals to control a device;

at least one graphical user interface in the memory of the process device, wherein the at least one graphical user interface displays a configuration to identify the plurality of composite data sources, wherein the at least one graphical user interface can respond to an input to the configuration to identify the plurality of composite data sources, wherein the at least one graphical user interface displays a set of instructions of the extract transform load module, wherein the at least one graphical user interface can respond to a request to select the set of instructions of the extract transform load module, wherein the at least one graphical user interface displays the business logic module, wherein the at least one graphical user interface can respond to an operation to select the plurality of metrics catalogs and the plurality of business intelligence blocks;

a set of graphical presentations of a plurality of processed data comprising charts, graphs, reports, and tables, and a combination thereof on a computer device;

at least one network capable of transmitting the plurality of composite data from a plurality of composite data sources to the process device and transmitting the plurality of processed data to a computer device; and wherein the plurality of signal data is smoothed by interpolation when the plurality of signal data comprises a plurality of missing signal points.

2. The system of claim 1, wherein the composite data master file resides in the memory of the process device.

3. The system of claim 1, further comprising a plurality of artificial intelligence and machine learning algorithms in the artificial intelligence and machine learning and algorithm library and a list of training sets in the training set repository module for the plurality of artificial intelligence and machine learning algorithms, wherein the training set repository module can be operated and enhanced in an offline setting, wherein a plurality of output from the plurality of artificial intelligence and machine learning algorithms can be input into the plurality of metrics catalogs.

4. The system of claim 1, wherein the plurality of composite data coming currently is compared with the plurality of composite data received previously in the data reception module, wherein an alert is issued from the data reception module to show a discrepancy between the plurality of composite data coming currently and the plurality of composite data received previously.

5. The system of claim 1, wherein the business logic module, the extract transform load module, the artificial intelligence and machine learning and algorithm library, and the training set repository module can be operated on the at least one graphical user interface by the user without programming.

* * * * *